United States Patent
Funaoka

(10) Patent No.: US 10,303,287 B2
(45) Date of Patent: May 28, 2019

(54) INFORMATION PROCESSING DEVICE AND DISPLAY CONTROL METHOD

(71) Applicant: FUJITSU CONNECTED TECHNOLOGIES LIMITED, Kawasaki-shi, Kanagawa (JP)

(72) Inventor: Makoto Funaoka, Kawasaki (JP)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 0 days.

(21) Appl. No.: 15/423,484

(22) Filed: Feb. 2, 2017

(65) Prior Publication Data
US 2017/0255323 A1 Sep. 7, 2017

(30) Foreign Application Priority Data
Mar. 3, 2016 (JP) ................. 2016-041084

(51) Int. Cl.
G06F 3/045 (2006.01)
G06F 3/041 (2006.01)
G06F 3/044 (2006.01)
G09G 5/38 (2006.01)

(52) U.S. Cl.
CPC ........... *G06F 3/0416* (2013.01); *G06F 3/044* (2013.01); *G09G 5/38* (2013.01); *G06F 2203/04101* (2013.01); *G06F 2203/04105* (2013.01); *G09G 2340/0464* (2013.01); *G09G 2354/00* (2013.01)

(58) Field of Classification Search
USPC ....... 345/173, 174, 156, 157, 158, 169, 175, 345/666, 619
See application file for complete search history.

(56) References Cited

U.S. PATENT DOCUMENTS

| | | | | |
|---|---|---|---|---|
| 2011/0291945 | A1* | 12/2011 | Ewing, Jr. ............. | G06F 1/1686 345/173 |
| 2013/0063495 | A1* | 3/2013 | Milan ................... | G06T 3/0012 345/666 |
| 2013/0162667 | A1* | 6/2013 | Eskolin ................ | G06F 3/0488 345/619 |
| 2013/0271415 | A1* | 10/2013 | Graumann ............. | G06F 3/041 345/173 |
| 2014/0009415 | A1* | 1/2014 | Nishida ............... | G06F 3/04886 345/173 |
| 2014/0104180 | A1* | 4/2014 | Schaffer .................. | G06F 3/02 345/169 |

(Continued)

FOREIGN PATENT DOCUMENTS

JP 2012-038062 2/2012
JP 2012-108674 6/2012

(Continued)

*Primary Examiner* — Thuy N Pardo
(74) *Attorney, Agent, or Firm* — Maschoff Brennan

(57) ABSTRACT

An information processing device includes a memory and a processor coupled to the memory. The processor is configured to determine whether a first action is performed. The first action is defined as indicating an intention to contact an object displayed at a position that may not be contacted by a thumb approaching a display unit on which a screen image is displayed. The processor is configured to move, when it is determined that the first action is performed, the screen image in a direction in which the object approaches the thumb.

15 Claims, 26 Drawing Sheets

(56) References Cited

U.S. PATENT DOCUMENTS

| | | | |
|---|---|---|---|
| 2014/0160073 A1 | 6/2014 | Matsuki | |
| 2014/0362016 A1* | 12/2014 | Matsuki | G06F 3/041 345/173 |
| 2015/0062036 A1* | 3/2015 | Tasaki | G09G 5/37 345/173 |
| 2015/0077326 A1* | 3/2015 | Kramer | G06F 3/0325 345/156 |
| 2015/0177866 A1* | 6/2015 | Hwang | G06F 3/042 345/175 |
| 2015/0199030 A1* | 7/2015 | Mikkola | G06F 3/0489 345/157 |
| 2016/0034058 A1* | 2/2016 | Stauber | G08C 17/02 345/173 |
| 2016/0077551 A1* | 3/2016 | Fujino | G06F 1/1694 345/173 |
| 2016/0252968 A1* | 9/2016 | Noble | G06F 3/0488 345/156 |

FOREIGN PATENT DOCUMENTS

| | | |
|---|---|---|
| JP | 2013-030050 | 2/2013 |
| JP | 2014-179877 | 9/2014 |

* cited by examiner

INFORMATION PROCESSING DEVICE AND DISPLAY CONTROL METHOD

CROSS-REFERENCE TO RELATED APPLICATION

This application is based upon and claims the benefit of priority of the prior Japanese Patent Application No. 2016-041084, filed on Mar. 3, 2016, the entire contents of which are incorporated herein by reference.

FIELD

The embodiments discussed herein are related to an information processing device and a display control method.

BACKGROUND

When the easiness of a one-hand operation is emphasized, a screen of a touch panel display of a tablet device (e.g., a smart phone) is required to have a size enabling the thumb to touch any point on the screen in a state where the tablet device is grasped by one hand. Meanwhile, when the easiness of a visual recognition of displayed contents is emphasized, the screen size is required to be large.

A technology exists, in which even when the screen size is large, in order to facilitate the one-hand operation, a screen image displayed on the screen is reduced overall, and the reduced screen image is displayed at a position where the operation by the thumb is easily performed. Also, a technology exists, which determines a region where the operation by the thumb may be performed, in order to determine a region where the reduced screen image is to be displayed.

Related techniques are disclosed in, for example, Japanese Laid-Open Patent Publication No. 2013-030050 and Japanese Laid-Open Patent Publication No. 2014-179877.

However, the technologies require a display change operation such as tapping a specific icon, in order to change between displaying and not displaying the reduced screen image. When the display change operation is frequently required, the user experience may be deteriorated. Further, the reduction of the screen image may cause an erroneous operation such as tapping an icon nearby an intended icon.

SUMMARY

According to an aspect of the present invention, provided is an information processing device including a memory and a processor coupled to the memory. The processor is configured to determine whether a first action is performed. The first action is defined as indicating an intention to contact an object displayed at a position that may not be contacted by a thumb approaching a display unit on which a screen image is displayed. The processor is configured to move, when it is determined that the first action is performed, the screen image in a direction in which the object approaches the thumb.

The object and advantages of the disclosure will be realized and attained by means of the elements and combinations particularly pointed out in the claims. It is to be understood that both the foregoing general description and the following detailed description are exemplary and explanatory and are not restrictive of the disclosure, as claimed.

DESCRIPTION OF EMBODIMENTS

First Embodiment

Hereinafter, a first embodiment will be described with reference to the drawings.

Figure 1:
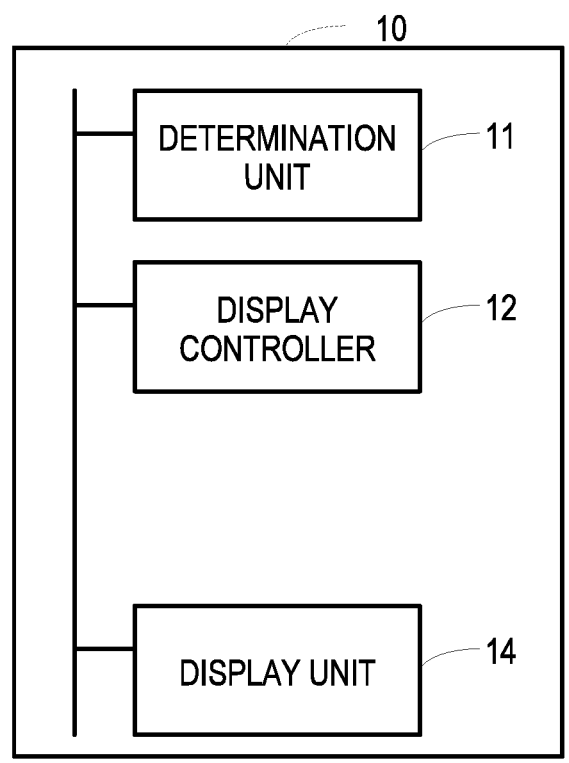
FIG. 1 is a diagram illustrating an exemplary functional configuration of a smart device according to a first embodiment.

As illustrated in FIG. 1, a smart device 10 as an example of an information processing device includes a determination unit 11, a display controller 12, and a display unit 14. The determination unit 11 determines whether an action is performed with an intention to contact an object displayed at a position which may not be contacted by the thumb approaching the display unit 14 displaying a screen image thereon. When it is determined by the determination unit 11 that the action with the intention to contact the object is performed, the display controller 12 performs a control to move the screen image in a direction in which the object approaches the thumb.

In the present embodiment, the information processing device is not limited to a smart device. The information processing device may be any device which may be grasped by one hand and is provided with a touch panel display. Examples of the information processing device include a mobile phone, a smart phone, a tablet computer, or the like.

Figure 2:
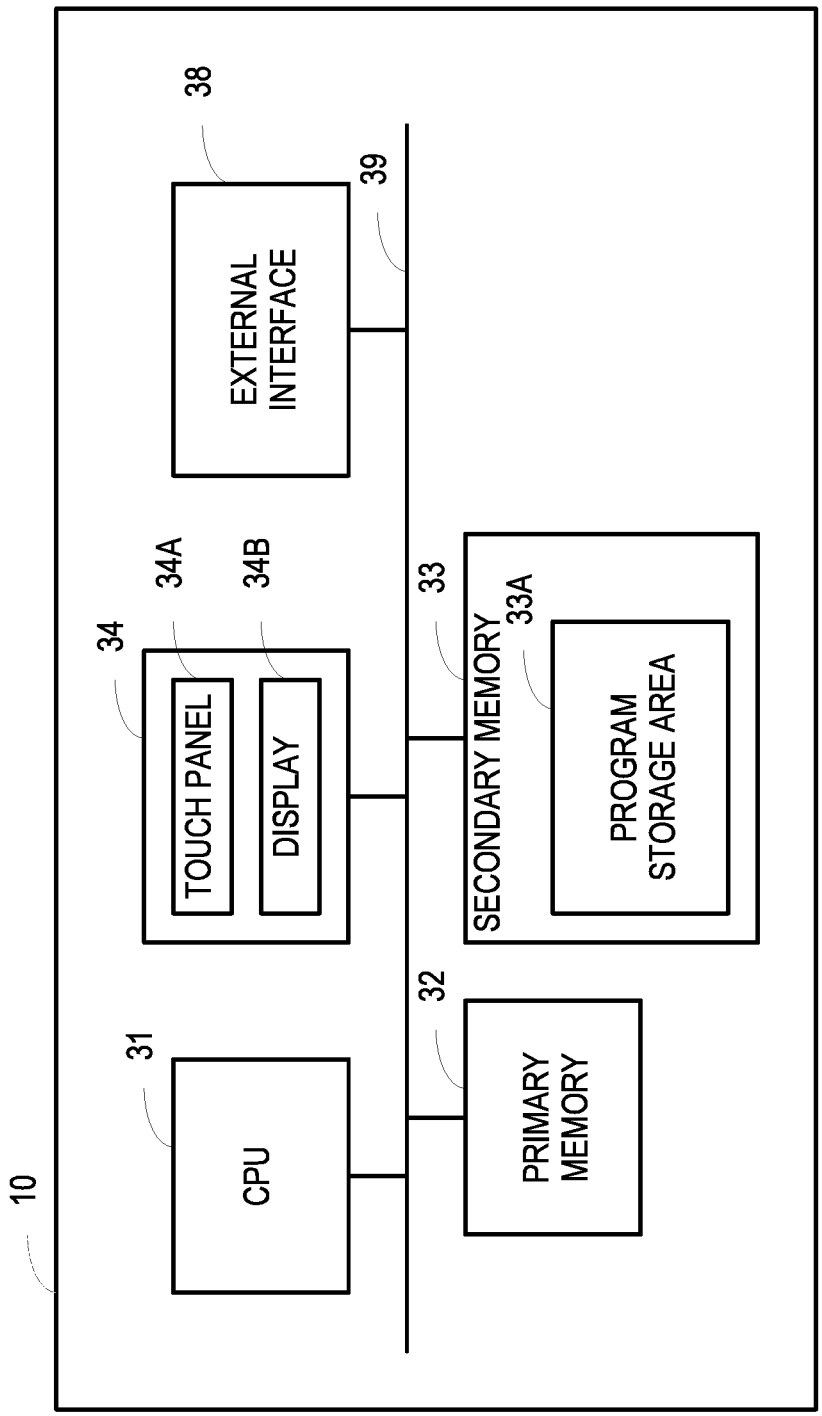
FIG. 2 is a diagram illustrating an exemplary hardware configuration of the smart device according to the first embodiment.

As illustrated in FIG. 2, the smart device 10 includes a central processing unit (CPU) 31 as an example of a processor, a primary memory 32, a secondary memory 33, a touch panel display 34, and an external interface 38. The CPU 31, the primary memory 32, the secondary memory 33, the touch panel display 34, and the external interface 38 are coupled to each other through a bus 39.

The primary memory 32 may be a volatile memory such as a random access memory (RAM). The secondary memory 33 may be a non-volatile memory such as a hard disk drive (HDD) or a solid state drive (SSD).

The secondary memory 33 includes a program storage area 33A storing a display control program.

The CPU 31 reads out the display control program from the program storage area 33A of the secondary memory 33, and loads the program in the primary memory 32. The CPU 31 executes the display control program so as to act as the determination unit 11 and the display controller 12 of FIG. 1. The display control program may be stored in an external server and loaded in the primary memory 32 through a network. The display control program may be stored in a non-transitory recording-medium such as a digital versatile disc (DVD) to be read by a recording-medium reading device and loaded in the primary memory 32.

The touch panel display 34 includes a touch panel 34A and a display 34B as an example of the display unit 14. The touch panel 34A detects a touching (contacting) action and a hovering (approaching) action with respect to the touch panel 34A. The display 34B displays a screen image such as a user interface screen including an object such as an application icon.

An external device is coupled to the external interface 38. The external interface 38 transmits and receives various types of information between the external device and the CPU 31.

Figure 3:
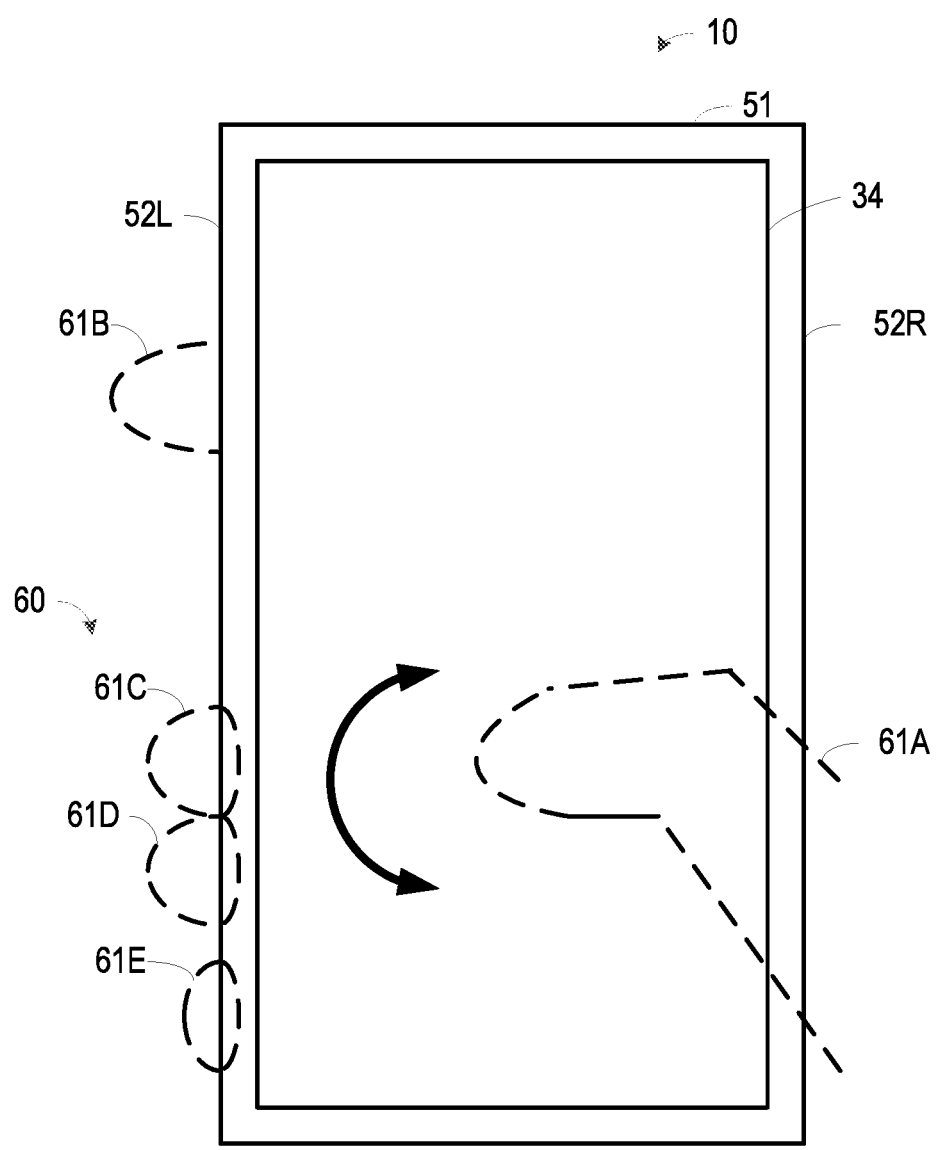
FIG. 3 is a diagram illustrating a display control process according to the first embodiment.

Subsequently, an operation of the smart device 10 according to the present embodiment will be described. In the present embodiment, an action of stretching a thumb 61A (FIG. 3) is performed as an example of an action with an intention to contact (which may be referred to "touch" hereinafter) an object displayed on the touch panel display 34. FIG. 3 illustrates a front view of the smart device 10 grasped by the right hand 60 of a user. The "front view" refers to a diagram of the smart device 10 viewed from the side of the touch panel display 34.

The Mount of Venus on the right hand 60 of the user is kept in a state of contacting with the right surface 52R of a housing 51 of the smart device 10 in the front view. The thumb 61A of the user is kept in a state of not contacting with the touch panel display 34. Further, the forefinger 61B, the middle finger 61C, the ring finger 61D, and the little finger 61E of the user contact with the left surface 52L of the housing 51 in the front view. When the user intends to touch an object displayed on the touch panel display 34, and the object is present within a range that the thumb 61A reaches, the thumb 61A is mostly in a slightly bent state as illustrated in FIG. 3.

Figure 4:
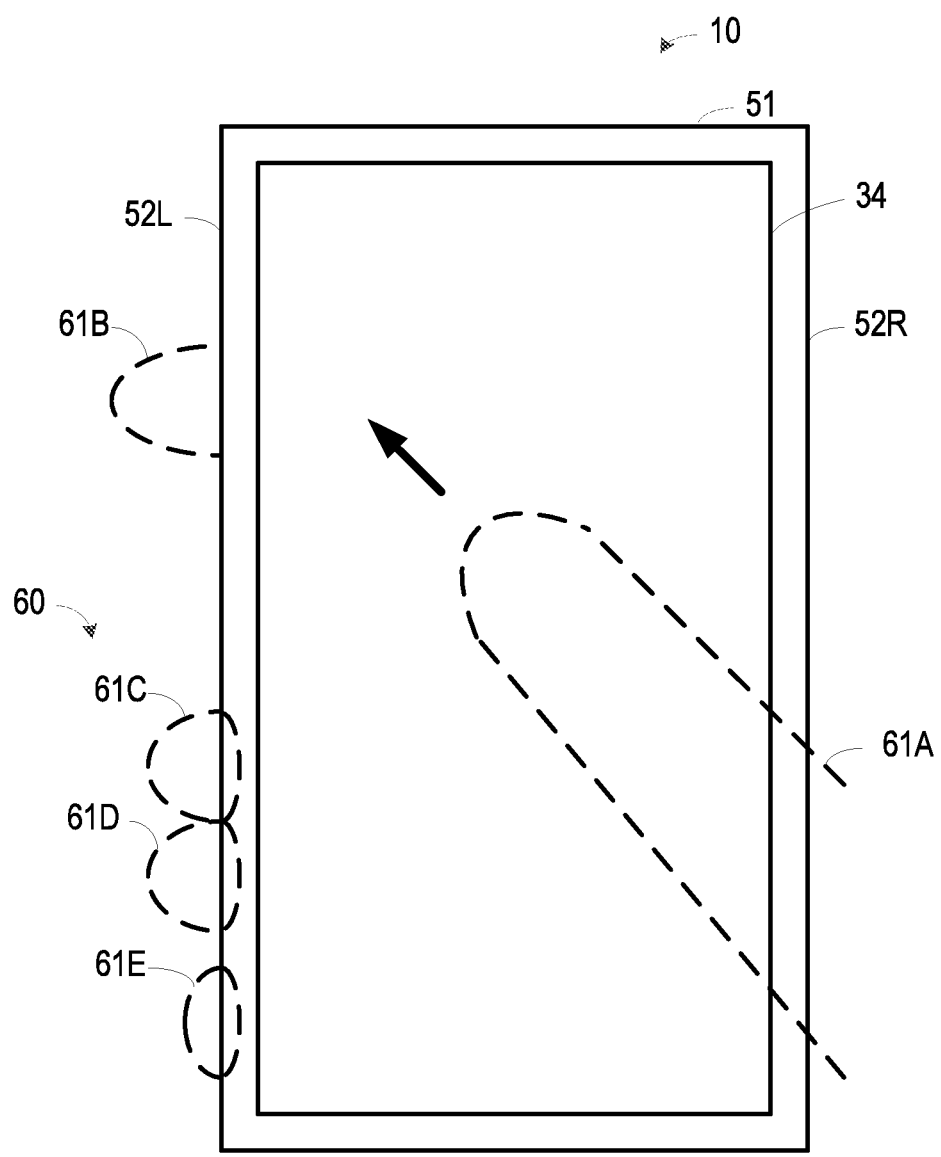
FIG. 4 is a diagram illustrating the display control process according to the first embodiment.

Meanwhile, when the user intends to touch an object displayed on the touch panel display 34, and the object is present beyond the range that the thumb 61A reaches, the user naturally stretches the thumb 61A as illustrated in FIG. 4. In this case, the thumb 61A may be stretched toward the object, while the user intending to touch the object.

Figure 5:
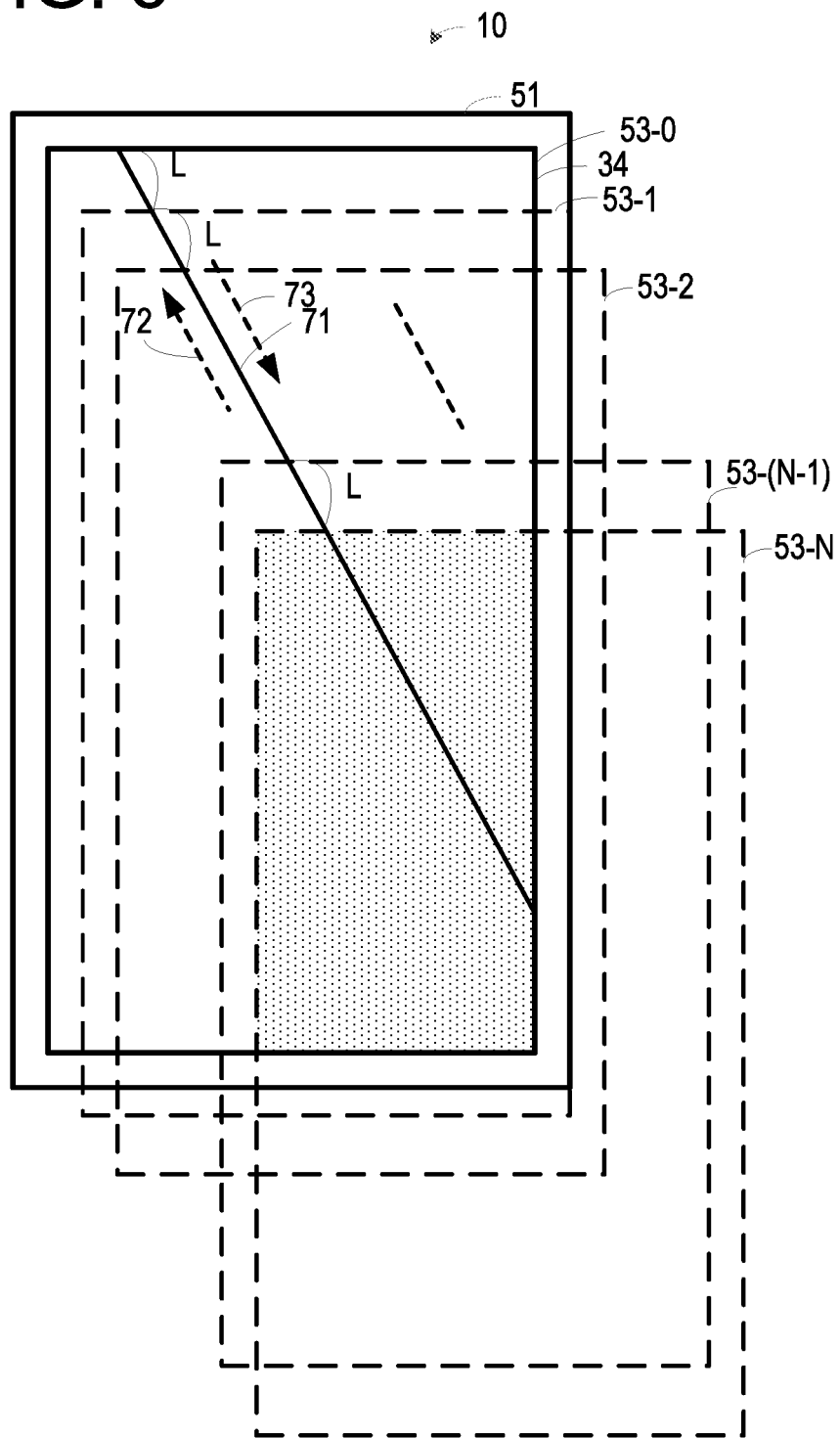
FIG. 5 is a diagram illustrating the display control process according to the first embodiment.

According to the present embodiment, as illustrated in FIG. 5, when the thumb 61A is stretched, the CPU 31 performs a control to move a screen image 53-0 displayed on the touch panel display 34 in the direction of an arrow 73 indicating the reverse direction to an arrow 72 indicating the stretched direction of the thumb 61A. That is, the direction of the arrow 73 is the direction in which the object approaches the thumb 61A. The screen image 53-0 is a screen image in a normal display state prior to a display change process.

The straight line 71 indicates the orientation of the stretched thumb 61A. A movement amount L indicates a movement distance of the screen image 53-0. A screen image 53-N (N is a natural number) is a screen image that has been moved N times by the movement amount L. Hereinafter, the screen image may be referred to as a "screen image 53" when screen images are not discriminated.

A screen image 53-1 is obtained when the screen image 53-0 is moved by the movement amount L. A screen image 53-2 is obtained when the screen image 53-1 is moved by the movement amount L. The movement amount L may be, for example, $\frac{1}{20}$ to $\frac{1}{10}$ of the diagonal length of the touch panel display 34.

Figure 6:
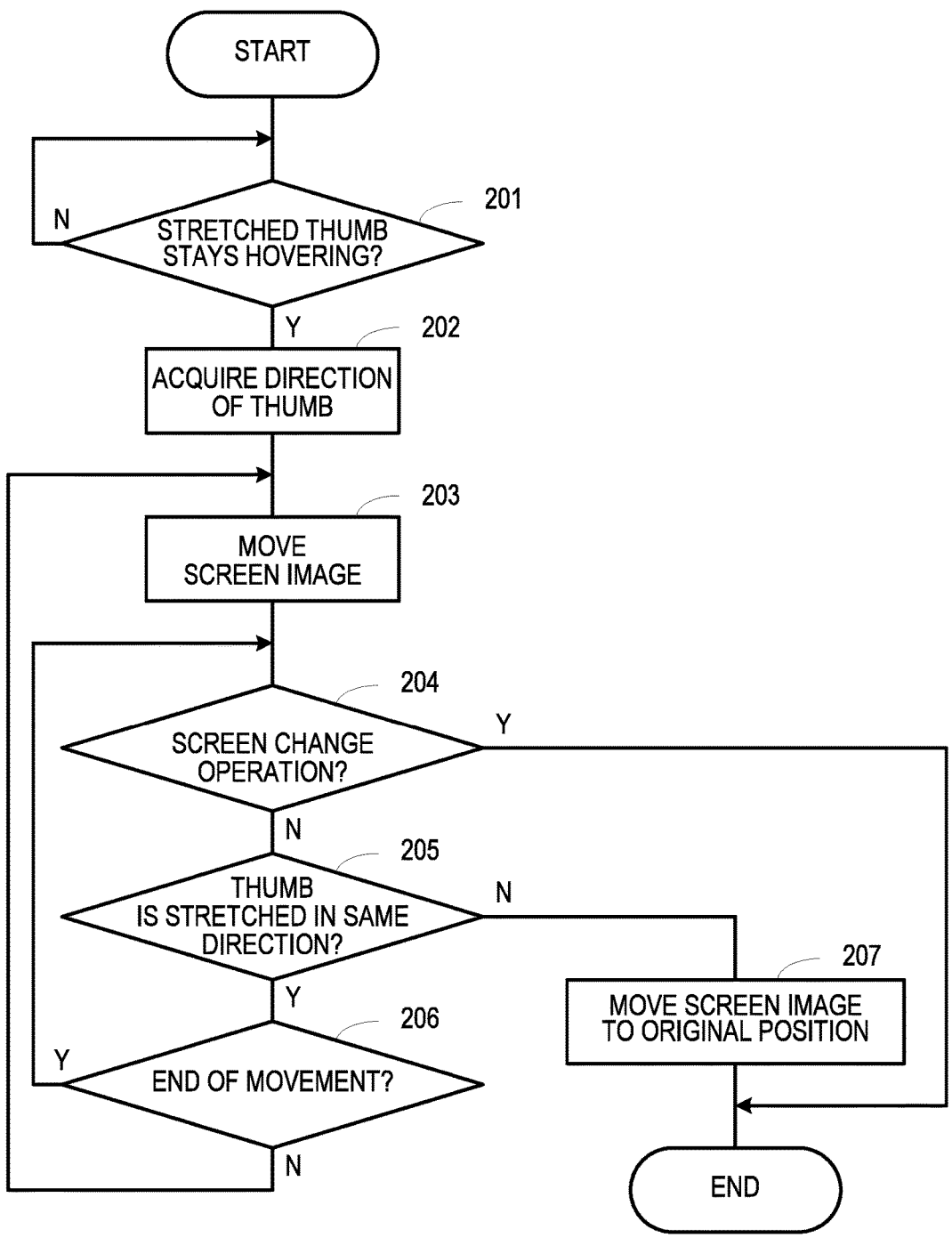
FIG. 6 is a flowchart illustrating an exemplary flow of the display control process according to the first embodiment.

For example, when the power of the smart device 10 is turned ON, the display control process illustrated in FIG. 6 is started. In 201, the CPU 31 determines whether the thumb 61A is hovering over the touch panel display 34, and the hovering thumb 61A is stretched for a predetermined time or longer. The predetermined time may be, for example, 2 seconds. The determination in 201 is repeated until the result of the determination is "Yes".

Figure 7:
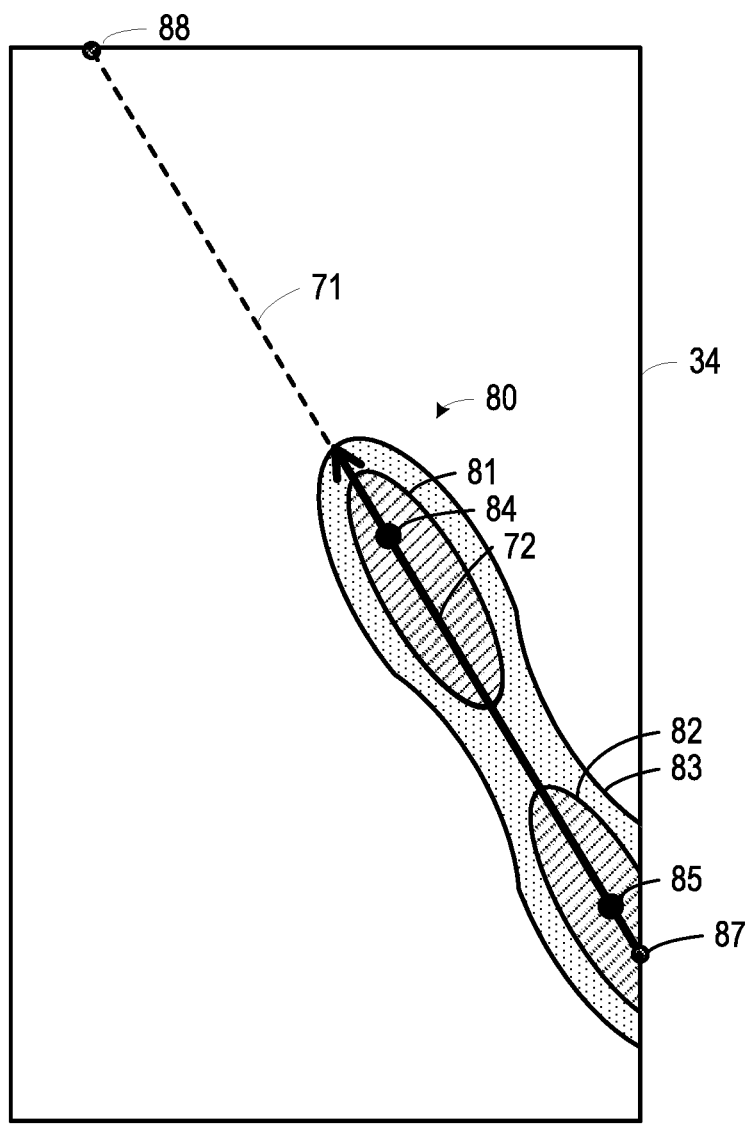
FIG. 7 is a diagram illustrating the display control process according to the first embodiment.

When the thumb 61A is hovering over the touch panel display 34, an electrostatic capacitance depending on the irregularities of the ventral surface of the thumb 61A is detected by the touch panel 34A, as illustrated in FIG. 7. Accordingly, the CPU 31 may determine whether the thumb 61A is stretched, by determining whether the area of a region 80 exceeds a predetermined area. Here, the region 80 is a region where the electrostatic capacitance detected by the touch panel 34A exceeds a predetermined value.

The predetermined area may be the area of a region where the electrostatic capacitance exceeds a predetermined value, when the thumb 61A in the stretched state is hovering over the touch panel display 34. The predetermined area may be registered in advance by a user, for example. Alternatively, the area of the region 80 detected prior to the stretching of the thumb 61A may be registered as an initial value, and the CPU 31 may determine whether the thumb 61A is stretched by determining whether the area of the region 80 increases by a predetermined value or more from the initial value.

When the result of the determination is "Yes" in 201, the CPU 31 acquires the direction of the thumb 61A in 202.

The region 80 illustrated in FIG. 7 includes a region 81 between the first joint and the tip end of the thumb 61A, and a region 82 between the first joint and the root of the thumb 61A. The regions 81 and 82 exhibit higher electrostatic capacitances than that of a region 83 included in the region 80 and other than the regions 81 and 82. The straight line 71 passing points 84 and 85 in the regions 81 and 82, respectively, where the electrostatic capacitance is the highest, indicates the direction of the thumb 61A.

The straight line 71 intersects the ends of the touch panel display 34 at points 87 and 88. The stretched direction of the thumb 61A (which may be referred to as the "direction of the thumb 61A" hereinafter) is the direction from a point of the higher electrostatic capacitance side toward a point of the lower electrostatic capacitance side, between the points 87 and 88. The root of the thumb 61A is present near the point of the higher electrostatic capacitance side. In FIG. 7, the direction of the thumb 61A is the direction from the point 87 toward the point 88.

Figure 8:
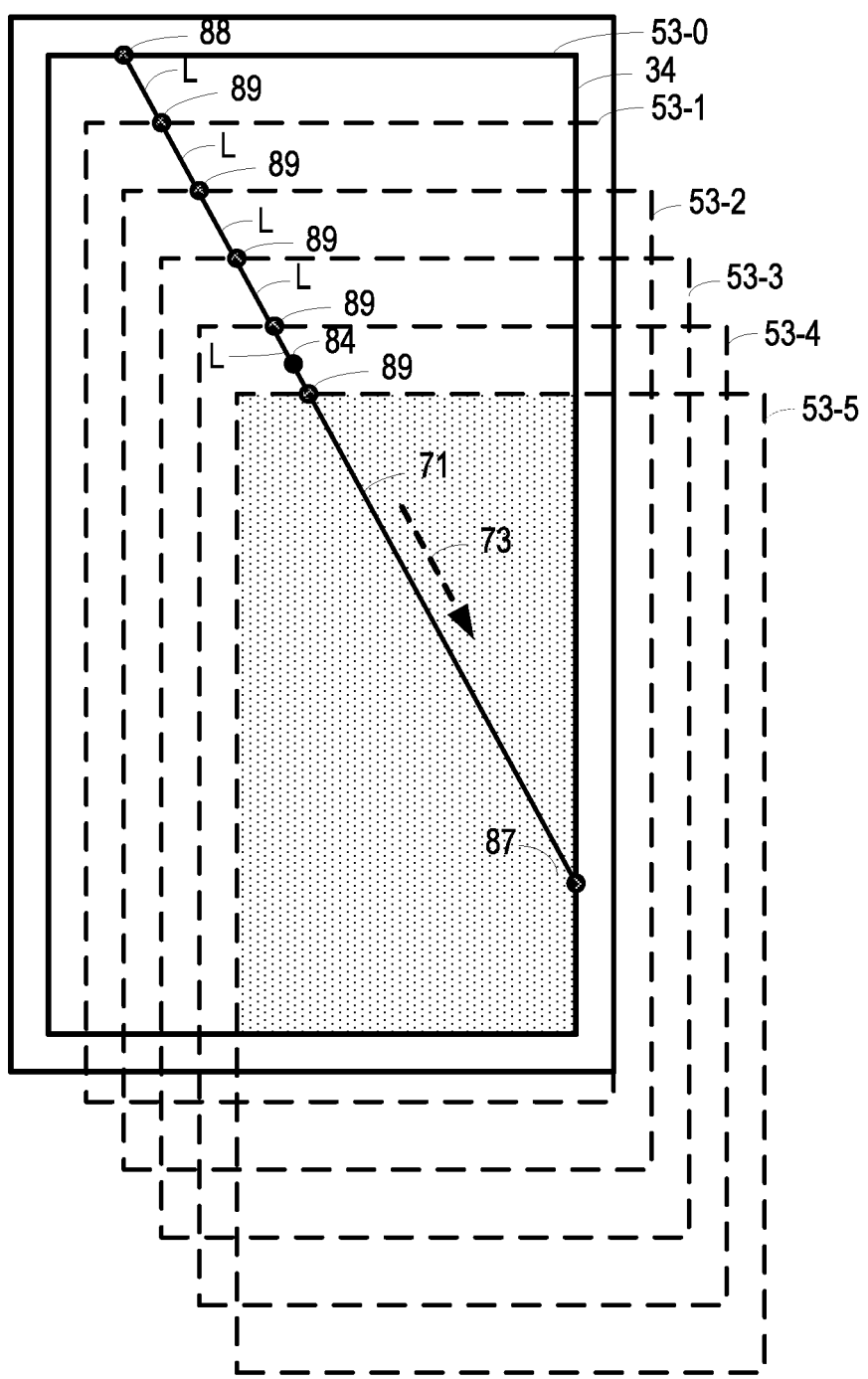
FIG. 8 is a diagram illustrating the display control process according to the first embodiment.

As illustrated in FIG. 8, in 203, the CPU 31 moves the screen image 53-0 displayed on the touch panel display 34 in the reverse direction to the direction of the thumb 61A, that is, in the direction indicated by the arrow 73 from the point 88 toward the point 87, by the movement amount L. That is, the CPU 31 performs the display change process. The screen image 53-1 represents a screen image after the movement.

In 204, the CPU 31 determines whether a screen change operation is detected. The screen change operation is a user's operation of touching an object (e.g., an application icon) with an intention to change a screen in order to, for example, start an application. When the result of the determination is "Yes" in 204, the CPU 31 ends the display control process, and performs a process corresponding to the detected screen change operation.

When the result of the determination is "No" in 204, the CPU 31 determines in 205 whether the thumb 61A is stretched in the same direction as the direction acquired in 202. When the result of the determination is "No" at 205, the CPU 31 causes the screen image 53 to be moved to the original position to cause the touch panel display 34 to display the screen image 53-0, and ends the display control process. When the direction of the thumb 61A is different from the direction acquired in 202, or when the stretched thumb 61A is bent, the result of the determination is "No" at 205. That is, when the user stops the action of stretching the thumb 61A toward a specific object, the CPU 31 causes the touch panel display 34 to display the screen image 53-0, and ends the display control process.

When the user is no longer interested in the object that the user has intended to touch, for example, when the user stretches the thumb 61A toward an object different from an object that the user has intended to touch, the user stops the action of stretching the thumb 61A. According to the present embodiment, the moved screen image 53 is moved back to the original position when the action of stretching the thumb 61A is stopped, that is, when the stretched thumb 61A is bent.

With the above-described control, the display change process may be started by stretching the thumb 61A, and the moved screen image 53 may be moved back to the original position by bending the stretched thumb 61A or changing the direction of the stretched thumb 61A. When the display change process is performed, the action of bending the stretched thumb 61A or the action of changing the direction of the stretched thumb 61A may be accidentally performed without an intention to move the screen image 53 back to the original position. Thus, the moved screen image 53 may be caused to be moved back to the original position when it is detected that the state of bending the stretched thumb 61A or changing the direction of the stretched thumb 61A is kept for a predetermined time.

When the result of the determination is "Yes" in 205, the CPU 31 determines in 206 whether the movement of the screen image 53 is ended. For example, it is determined that the movement of the screen image 53 is ended when a point 89 of the screen image 53 corresponding to the point 88 of FIG. 8 is moved beyond the point 84 corresponding to the highest position between the first joint and the tip end of the thumb 61A.

FIG. 8 illustrates an example where the movement of the screen image 53 is ended when the screen image 53-0 is moved five times. In the normal display state, the thumb 61A is stretched toward an object present between the points 84 and 88. Therefore, the object reaches the position where the thumb 61A may touch the object, before the point 89 corresponding to the point 88 is moved to the point 84.

When the result of the determination is "No" at 206, that is, when the movement of the screen image 53 is not ended, the CPU 31 returns to 203 to move the screen image 53 by the movement amount L. When the result of the determination is "Yes" at 206, the CPU 31 returns to 204 to repeat the processes of 204 to 206 until the result of the determination is "Yes" at 204 or the result of the determination is "No" at 205. That is, the CPU 31 causes the screen image 53 to be displayed as it is, without moving the image, while no screen change operation is performed and the thumb 61A is stretched in the same direction.

Figure 9:
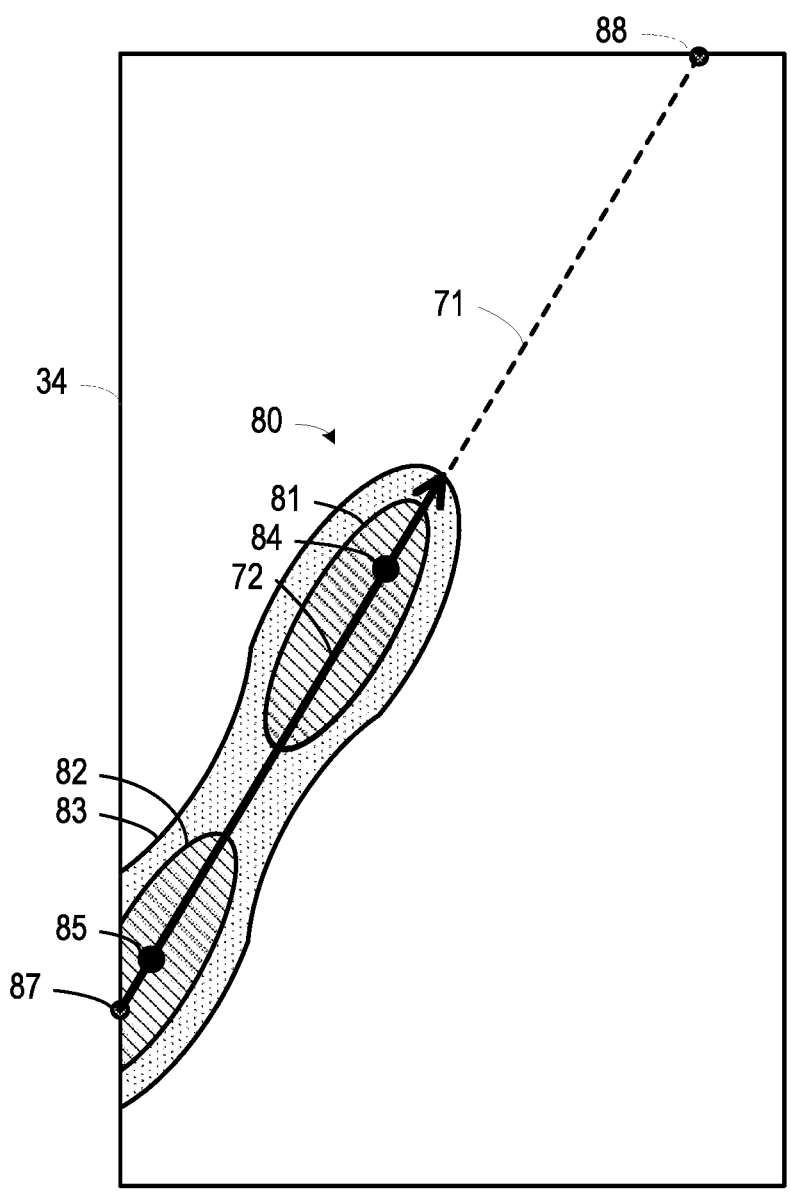
FIG. 9 is a diagram illustrating the display control process according to the first embodiment.
Figure 10:
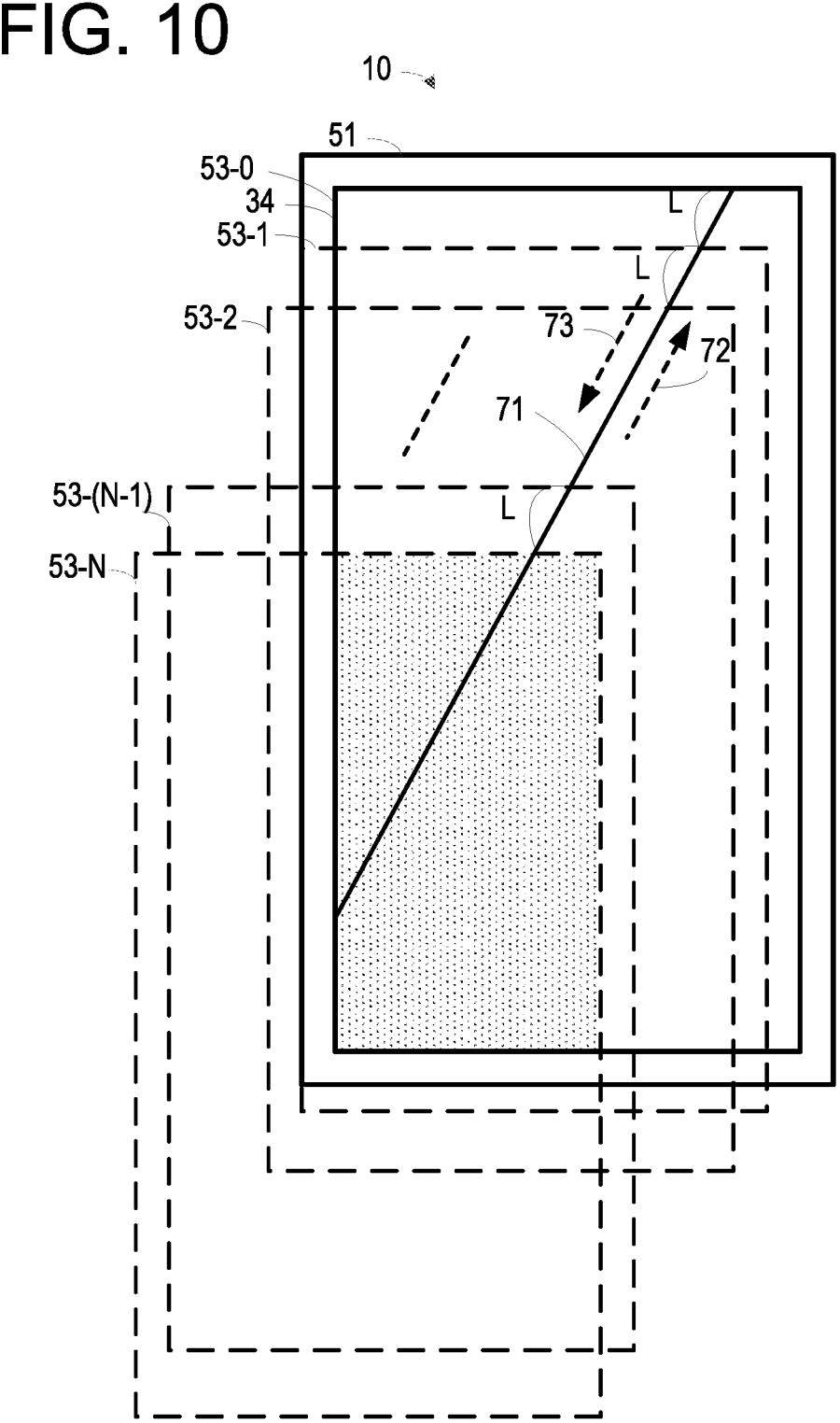
FIG. 10 is a diagram illustrating the display control process according to the first embodiment.

In the present embodiment, descriptions have been made on the example where the user grasps the smart device 10 with the right hand. However, the present embodiment may be equally applied to a case where the user grasps the smart device 10 with the left hand as well. FIG. 9 illustrates an example of the electrostatic capacitance detected when the thumb is stretched, in the case where the user grasps the smart device 10 with the left hand. FIG. 10 illustrates an example of the movement of the screen image 53.

Figure 11:
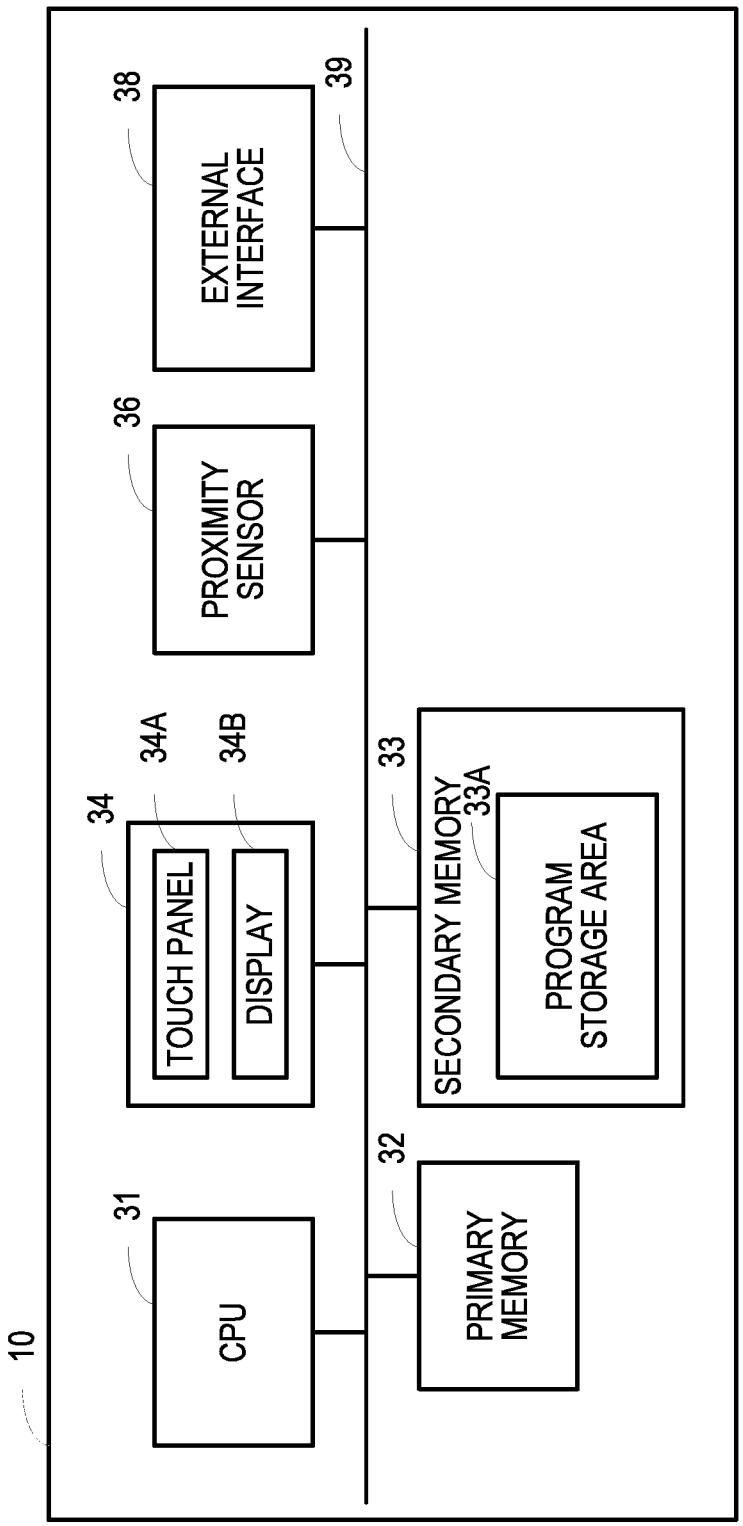
FIG. 11 is a diagram illustrating an exemplary hardware configuration of a smart device according to the first embodiment.

In the present embodiment, descriptions have been made on the example where the touch panel 34A detects the electrostatic capacitance generated by the thumb hovering over the touch panel display 34. However, the present embodiment is not limited to the example. For example, as illustrated in FIG. 11, the smart device 10 may further include a proximity sensor 36. The proximity sensor 36 may be any one of an induction type proximity sensor, an electrostatic capacitance type proximity sensor, an ultrasonic wave type proximity sensor, an electromagnetic wave type proximity sensor, and an infrared ray type proximity sensor. The CPU 31 may detect the thumb hovering over the touch panel display 34 by using the proximity sensor 36.

According to the present embodiment, the determination unit 11 determines whether an action is performed with an intention to contact an object displayed at a position that may not be contacted by the thumb approaching the display unit 14 displaying a screen image thereon. When it is determined by the determination unit 11 that the action with the intention to contact the object is performed, the display controller 12 performs a control to move the screen image in the direction in which the object approaches the thumb.

According to the present embodiment, the determination unit 11 determines whether an action of stretching the thumb approaching the display unit 14 is performed, as the action with an intention to contact the object. When it is determined that the action of stretching the thumb is performed, the display controller 12 performs a control to move the screen image in the reverse direction to the stretched direction of the thumb.

For example, when a user grasps a smart device 10 with one hand, and the user intends to touch an object (e.g., an application icon) present at a position that the thumb does not reach, the user stretches the thumb toward the object. According to the present embodiment, since the screen image is moved in the reverse direction to the stretched direction of the thumb, the object approaches the thumb.

According to the present embodiment, the determination unit 11 further determines whether the stretched thumb is bent. When it is determined by the determination unit 11 that the thumb is bent, the display controller 12 causes the moved screen image to be moved back to the original position.

That is, according to the present embodiment, the display change to a screen image which facilitates the one-hand operation on the information processing device may be implemented by the action of stretching the thumb toward an object, that is, a natural action for the user.

Second Embodiment

Subsequently, a second embodiment will be described with reference to the drawings. Descriptions of similar configurations and operations to those in the first embodiment will be omitted.

Figure 12:
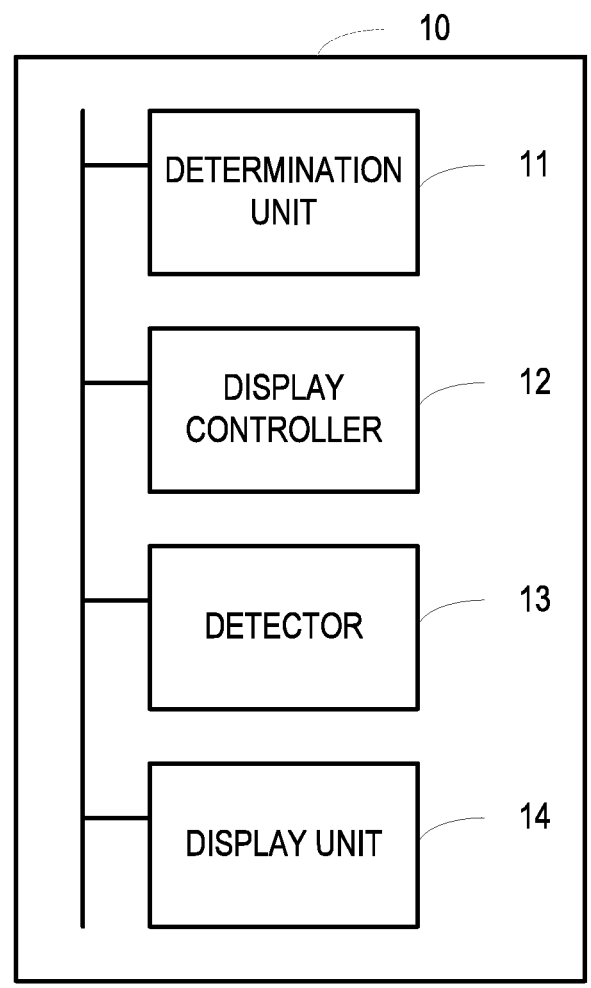
FIG. 12 is a diagram illustrating an exemplary functional configuration of a smart device according to second and third embodiments.

The smart device 10 illustrated in FIG. 12 includes a detector 13, in addition to the determination unit 11, the display controller 12, and the display unit 14. The detector 13 detects an operation amount on the smart device 10. The display controller 12 determines a movement amount of the screen image, based on the operation amount detected by the detector 13.

Figure 13:
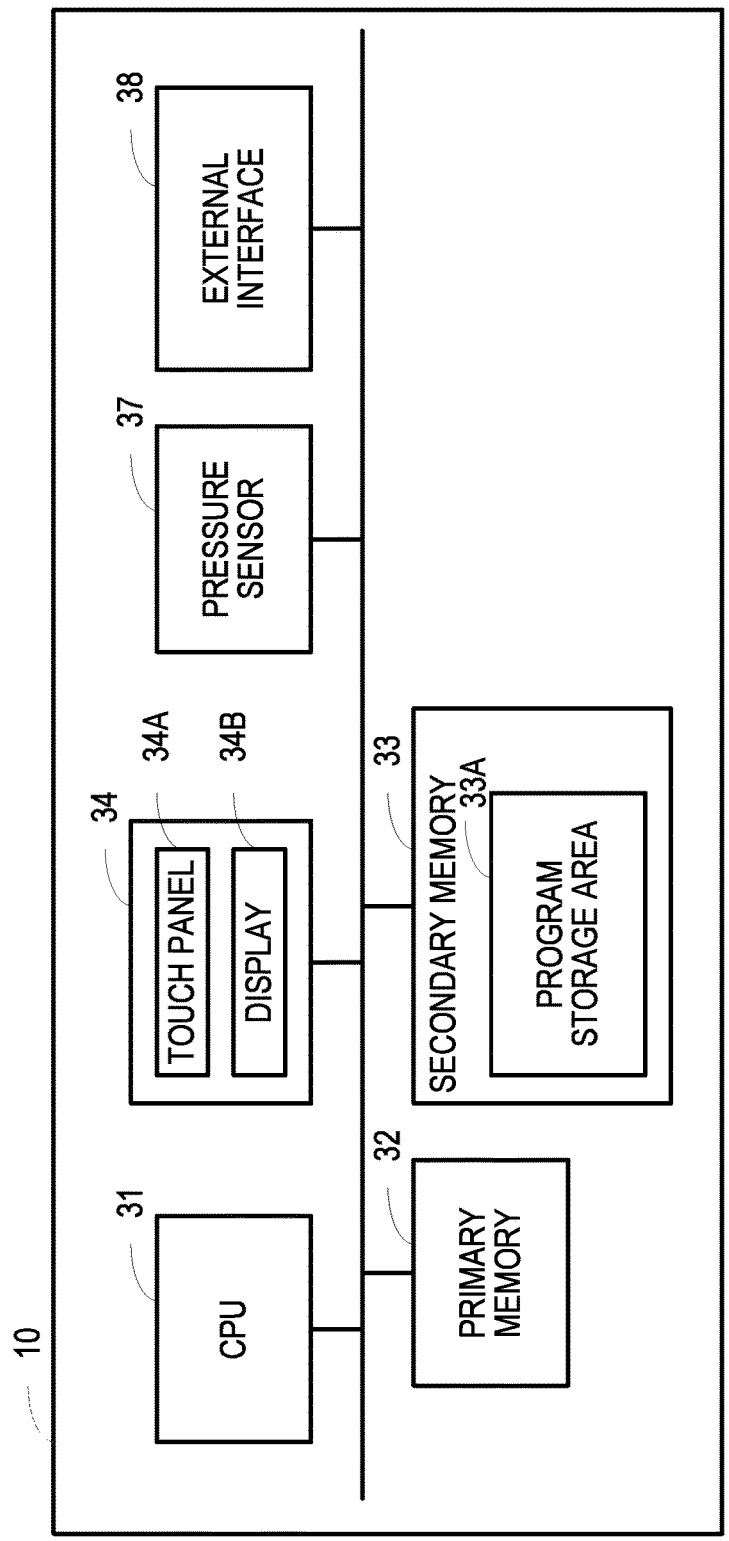
FIG. 13 is a diagram illustrating an exemplary hardware configuration of the smart device according to the second and third embodiments.
Figures 14A, 14B:
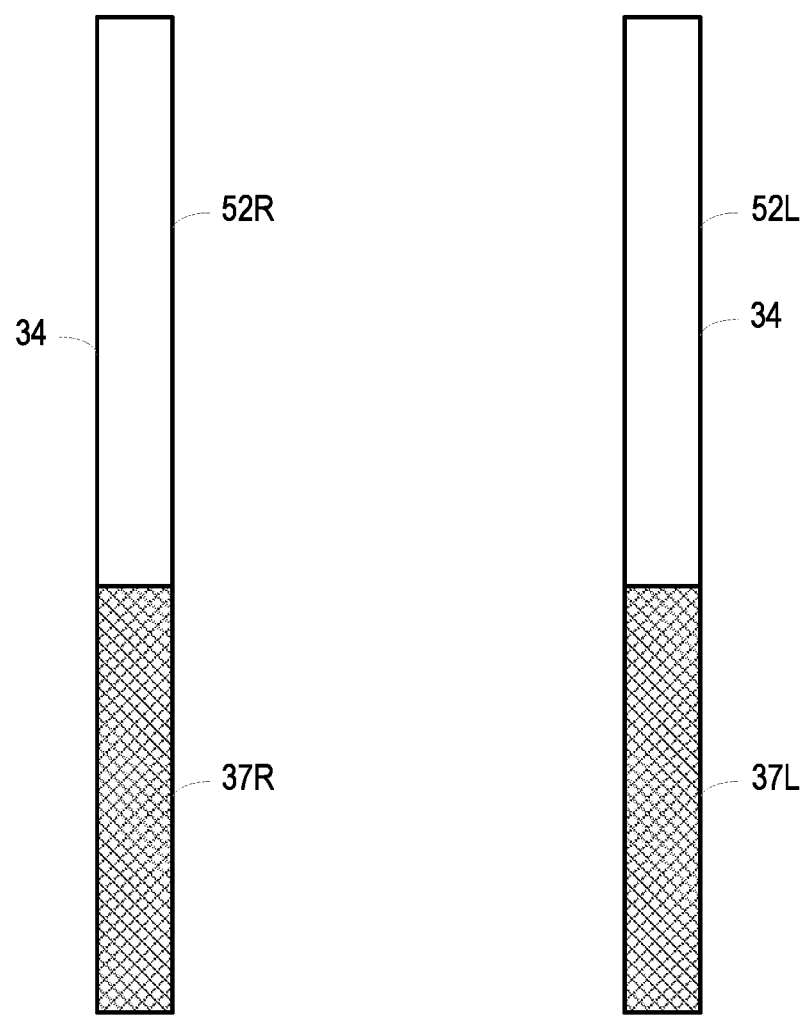
FIG. 14A is a diagram illustrating an example of a pressure sensor.
FIG. 14B is a diagram illustrating an example of a pressure sensor.

As illustrated in FIG. 13, the smart device 10 includes a pressure sensor 37 as an example of the detector. For example, as illustrated in FIG. 14A, a right pressure sensor 37R is provided in the lower portion of the right surface 52R of the smart device 10 in the front view. Further, as illustrated in FIG. 14B, a left pressure sensor 37L is provided in the lower portion of the left surface 52L of the smart device 10 in the front view.

Figure 15:
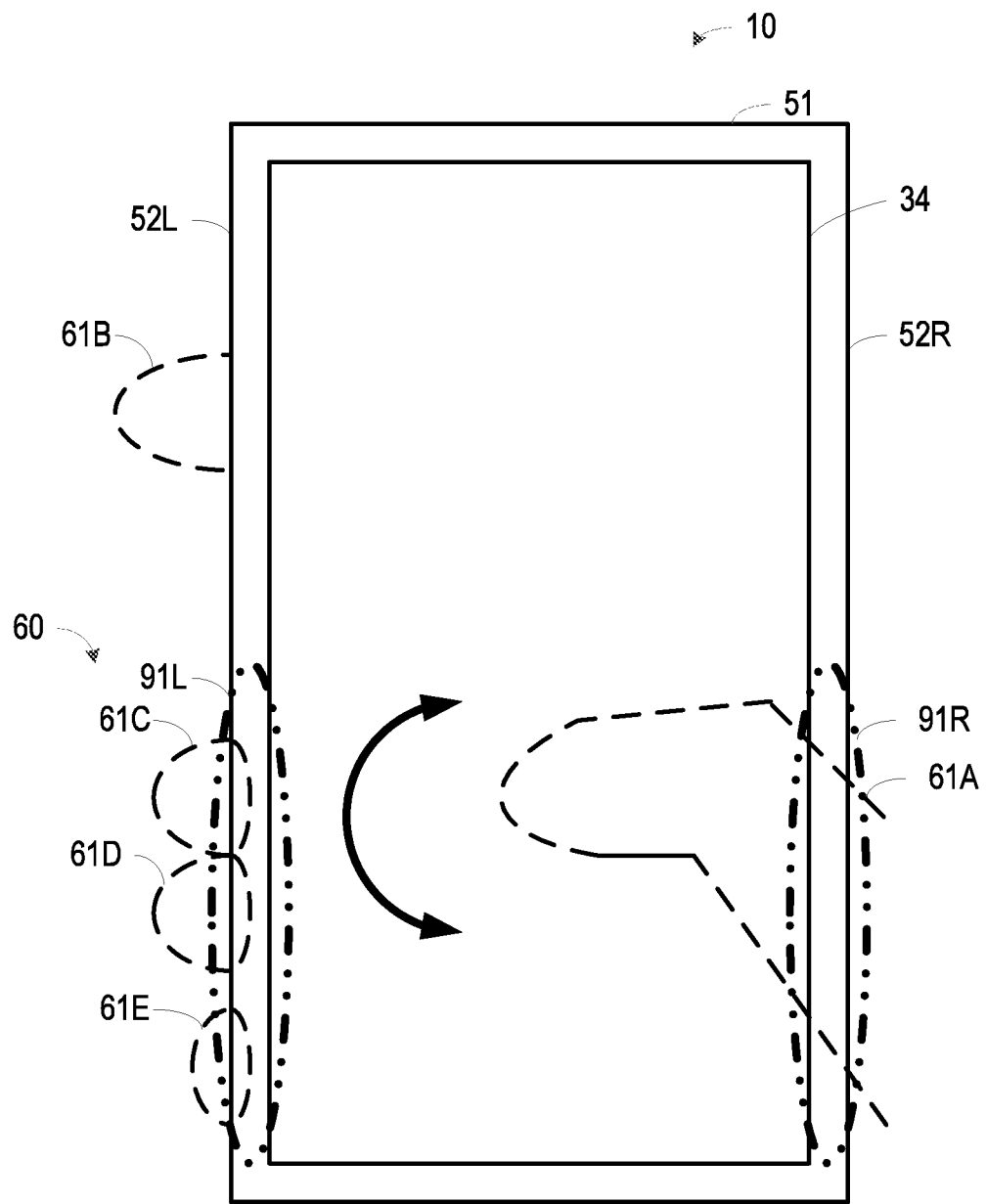
FIG. 15 is a diagram illustrating a display control process according to the second embodiment.

Subsequently, an operation of the smart device 10 according to the present embodiment will be described. In the present embodiment, an action of stretching the thumb 61A is performed as an example of an action with an intention to contact an object. FIG. 15 illustrates a front view of the smart device 10 grasped by the right hand 60 of the user. As illustrated in FIG. 15, when the thumb 61A is bent, the user loosely grasps the smart device 10 so that no strong pressure is applied to a region 91R with which the Mount of Venus on the palm contacts, and a region 91L with which the middle finger 61C, the ring finger 61D, and the little finger 61E contact.

Figure 16:
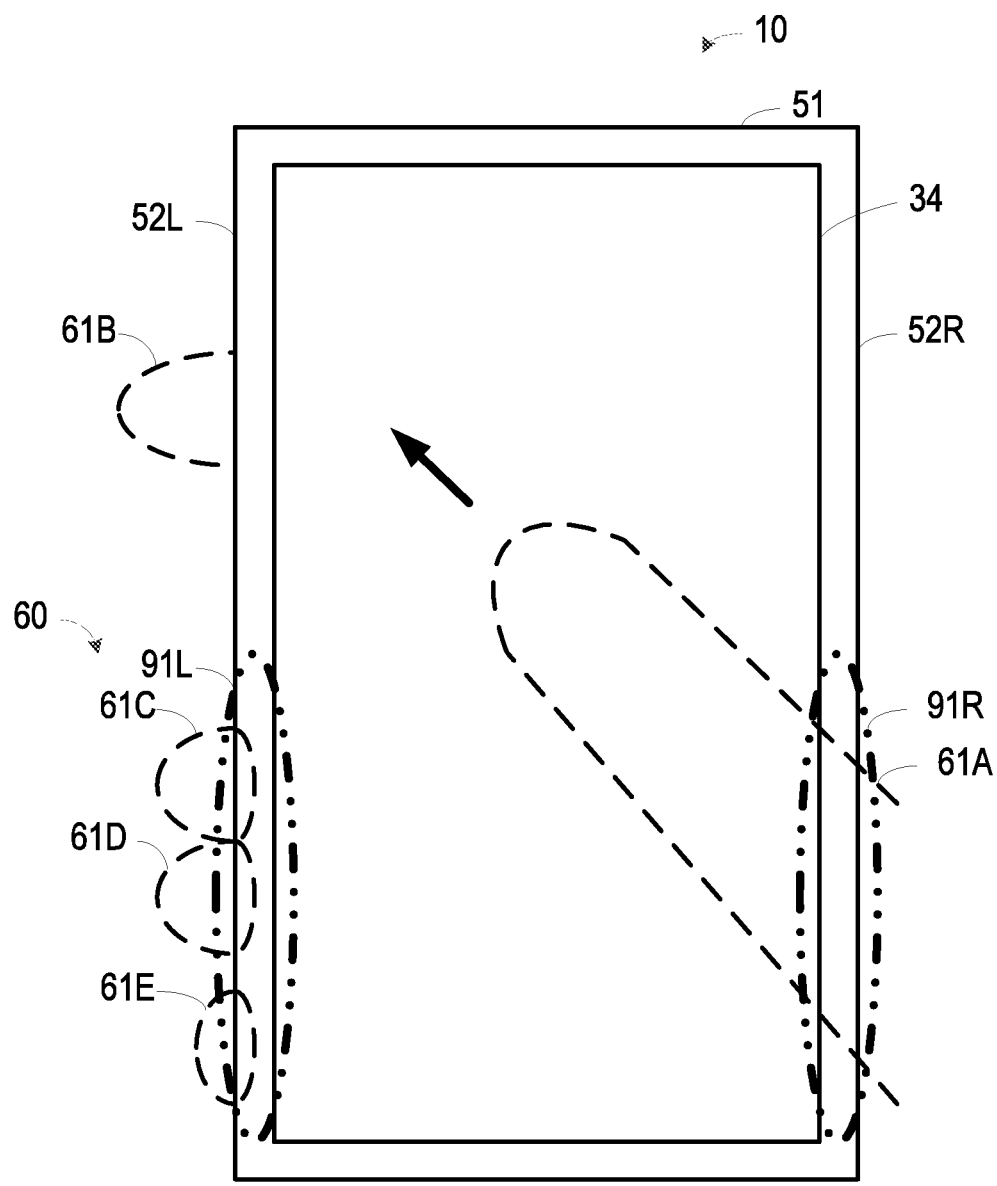
FIG. 16 is a diagram illustrating the display control process according to the second embodiment.

Meanwhile, as illustrated in FIG. 16, when the user stretches the thumb 61A with an intention to touch an object beyond the range that the thumb 61A reaches, the user strongly grasps the smart device 10 so that a strong pressure is applied to the regions 91R and 91L. In the present embodiment, descriptions are made on the example where the middle finger 61C, the ring finger 61D, and the little finger 61E contact with the region 91L. However, the present embodiment is not limited to the example. All that is required is that at least one of the forefinger 61B, the middle finger 61C, the ring finger 61D, and the little finger 61E contacts with the region 91L.

Figure 17:
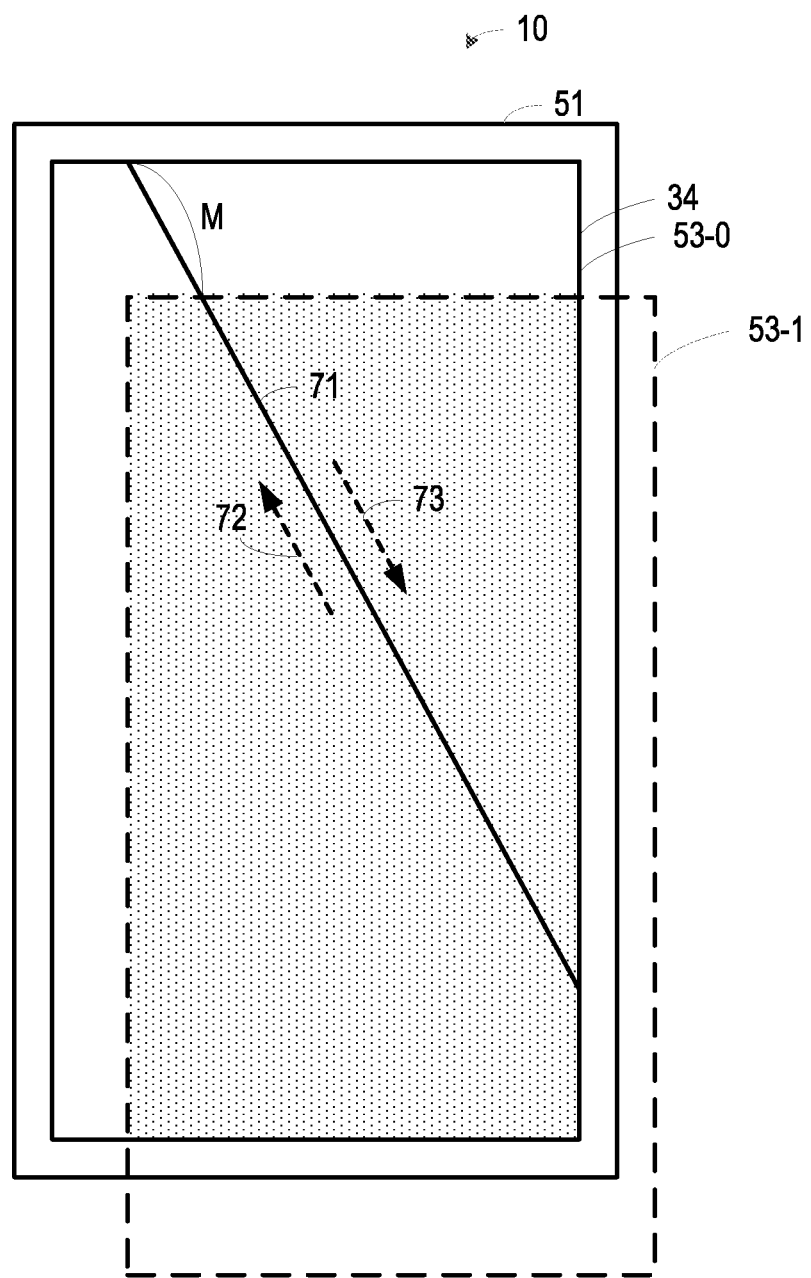
FIG. 17 is a diagram illustrating the display control process according to the second embodiment.

According to the present embodiment, as illustrated in FIG. 17, the CPU 31 determines, based on the pressure applied to the regions 91R and 91L, a movement amount M for moving the screen image 53-0 that is a screen image in the normal display state.

Figure 18:
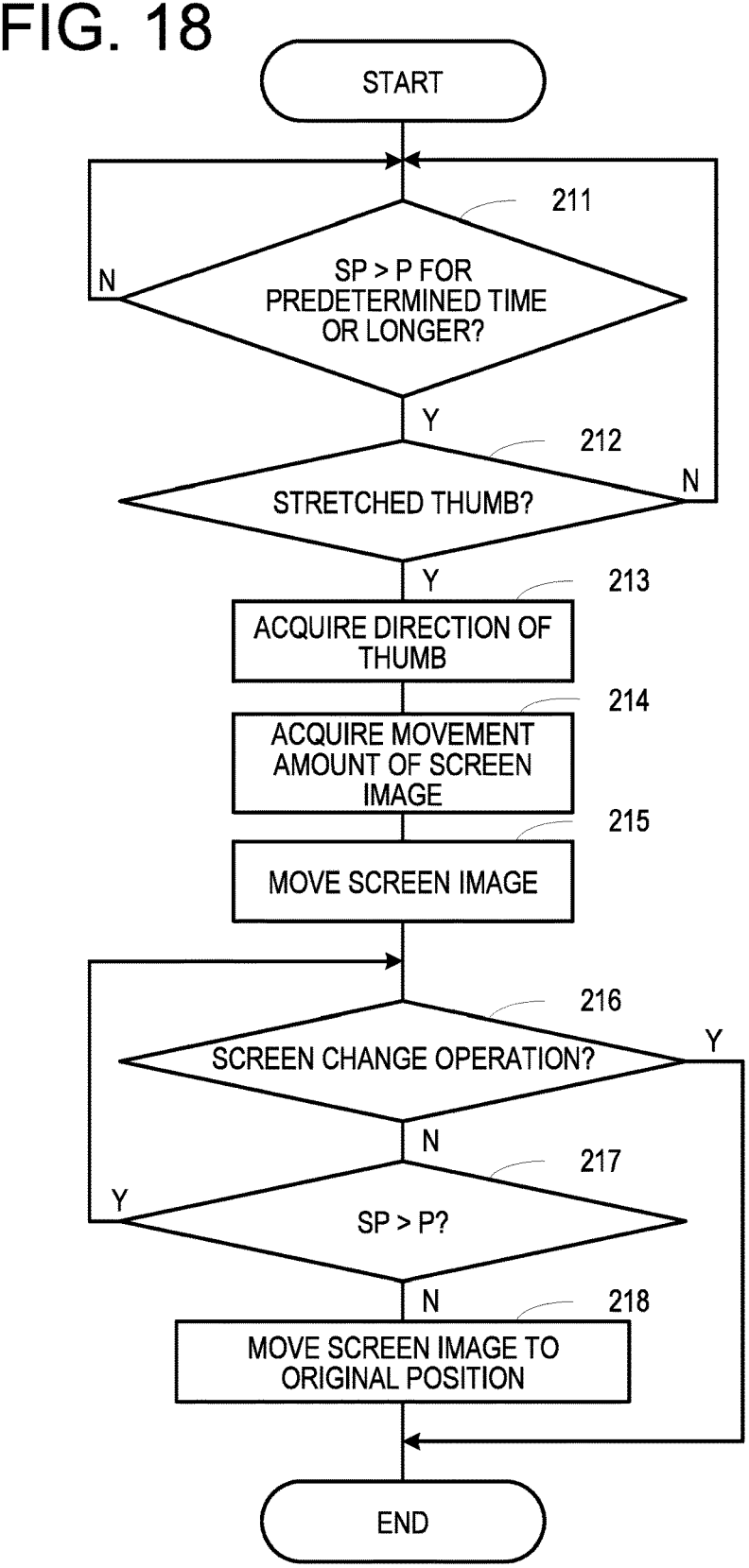
FIG. 18 is a flowchart illustrating an exemplary flow of the display control process according to the second embodiment.

For example, when the power of the smart device 10 is turned ON, the display control process illustrated in FIG. 18 is started. In 211, the CPU 31 determines whether a value SP of a pressure applied to the right pressure sensor 37R and the left pressure sensor 37L is equal to or more than a predetermined value P for a predetermined time or longer. The predetermined time may be, for example, 2 seconds. The determination in 211 is repeated until the result of the determination is "Yes".

The pressure value SP is an average of a value SPR of the pressure applied to the right pressure sensor 37R and a value SPL of the pressure applied to the left pressure sensor 37L. In 211, it is determined whether the condition of the expression (1) is met.

$$SP(=(SPR+SPL)/2)>P \tag{1}$$

When the result of the determination is "Yes" in 211, the CPU 31 determines in 212 whether the thumb 61A is stretched. When the result of the determination is "No" in 212, that is, when the thumb 61A is not stretched, the CPU 31 returns to 211. When the result of the determination is "Yes" in 212, the CPU 31 acquires the direction of the thumb 61A in 213.

Figure 19:
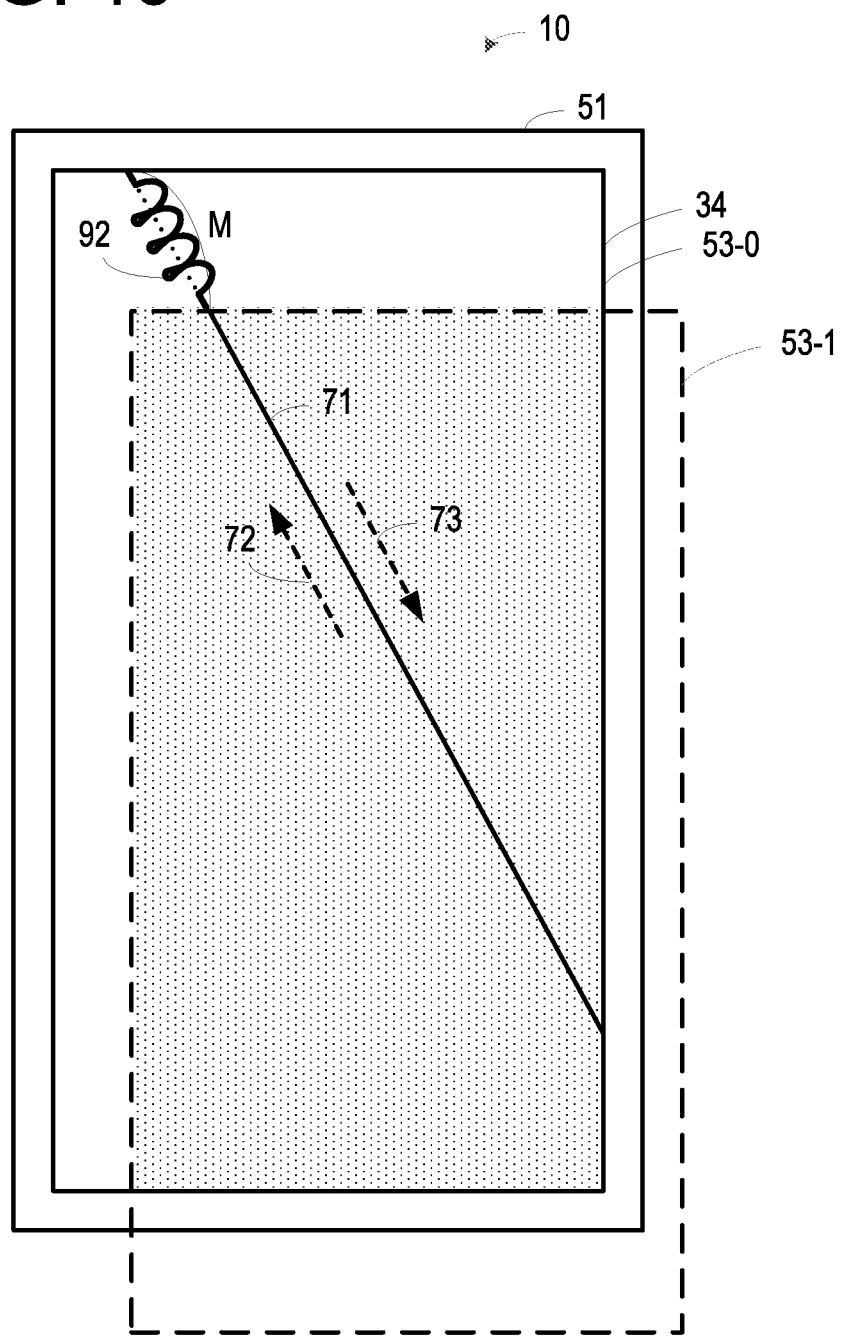
FIG. 19 is a diagram illustrating the display control process according to the second embodiment.

The CPU 31 acquires a movement amount M of the screen image 53-0 in 214. The movement amount M is determined based on the pressure detected by the right pressure sensor 37R and the left pressure sensor 37L. The movement amount M of the screen image 53-0 is acquired by applying, for example, the expression (2) for a model of a spring 92 (FIG. 19) having a spring constant K.

$$M=SP/K \tag{2}$$

While descriptions have been made on the example where the movement amount M is acquired by applying the expression (2), the present embodiment is not limited to the example. All that is required is that the movement amount M is determined to increase as the value of the pressure increases.

In 215, the CPU 31 causes the screen image 53-0 to be moved, by the movement amount M, in the direction of the arrow 73 indicating the reverse direction to the direction of the arrow 72 indicating the stretched direction of the thumb 61A acquired in 213. Then, the CPU 31 causes the touch panel display 34 to display the moved screen image 53-1. In 216, the CPU 31 determines whether a screen change operation is detected. When the result of the determination is "Yes" in 216, the CPU 31 ends the display control process, and performs a process corresponding to the screen change operation.

When the result of the determination is "No" at 216, the CPU 31 determines in 217 whether the value SP, which is the average of the value SPR of the pressure applied to the right pressure sensor 37R and the value SPL of the pressure applied to the left pressure sensor 37L, exceeds the predetermined value P. When the result of the determination is "Yes" in 217, that is, when the condition of the expression (1) is met, the CPU 31 returns to 216. That is, when the smart device 10 is kept in the state of being strongly grasped by the user, the screen image 53-1 is not moved and is displayed as it is. Meanwhile, when the result of the determination is "No" at 217, that is, when the smart device 10 is loosely grasped by the user, the CPU 31 causes the screen image 53-1 to be moved back to the original position to cause the screen image 53-0 to be displayed, in 218.

In the present embodiment, descriptions have been made on the example where two pressure sensors 37 are provided in the lower portions of the lateral surfaces 52R and 52L of the housing 51 of the smart device 10 in the front view. However, the present embodiment is not limited to the example. For example, the pressure sensor 37 may be provided in only one of the lateral surfaces 52R and 52L of the housing 51 of the smart device 10 in the front view.

Figure 20A:
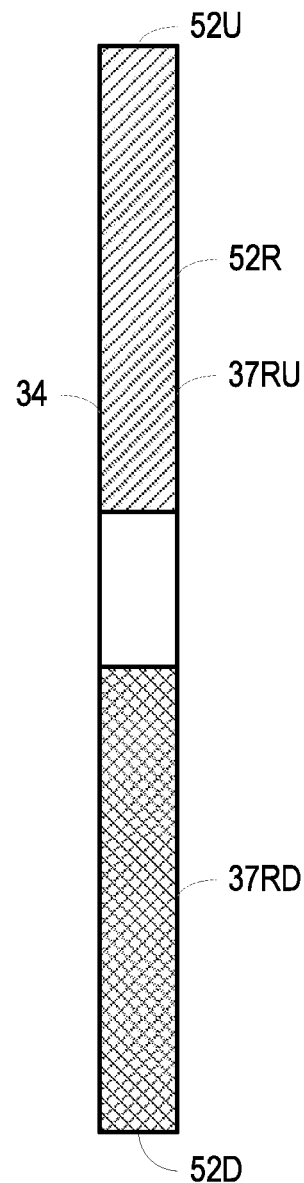
FIG. 20A is a diagram of an example of a pressure sensor.
Figure 20B:
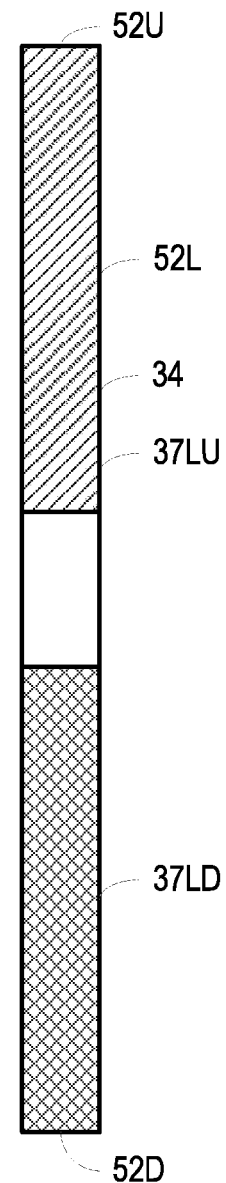
FIG. 20B is a diagram of an example of a pressure sensor.

As illustrated in FIG. 20A, the smart device 10 may include a pressure sensor 37RU in the upper portion of the right lateral surface 52R of the housing 51 of the smart device 10 in the front view and a pressure sensor 37RD in the lower portion thereof. In addition, as illustrated in FIG. 20B, the smart device 10 may include a pressure sensor 37LU in the upper portion of the left lateral surface 52L of the housing 51 of the smart device 10 in the front view and a pressure sensor 37LD in the lower portion thereof. When the smart device 10 is grasped with a top surface 52U facing upward, the pressure may be detected by the pressure sensors 37RD and 37LD provided in the lower portions in that position. In addition, when the smart device 10 is grasped with the bottom surface 52D facing upward, the pressure may be detected by the pressure sensors 37RU and 37LU provided in the lower portions in that position.

In the present embodiment, descriptions have been made on the example where the movement amount M is determined depending on the pressure value. However, the present embodiment is not limited to the example. The movement amount M may be a predetermined value (e.g., a fixed value).

In the present embodiment, descriptions have been made on the example where the pressure value is applied as an example of the operation amount. However, the present embodiment is not limited to the example. For example, the length of the hovering time during which the thumb 61A is stretched and hovering over the touch panel display 34 may be applied as the operation amount. In this case, the movement amount M of the screen image 53-0 may be increased in proportion to the length of the hovering time.

In the present embodiment, the process of at least a portion of the first embodiment may be applied. For example, in the present embodiment, descriptions have been made on the example where the screen image 53-1 is moved back to the original position when the value SP of the pressure applied to the smart device 10 does not exceed the predetermined value P. However, the present embodiment is not limited to the example. For example, the screen image 53-1 may be moved back to the original position when the thumb 61A is bent or when the direction of the thumb 61A is changed, as in the first embodiment.

Figure 21:
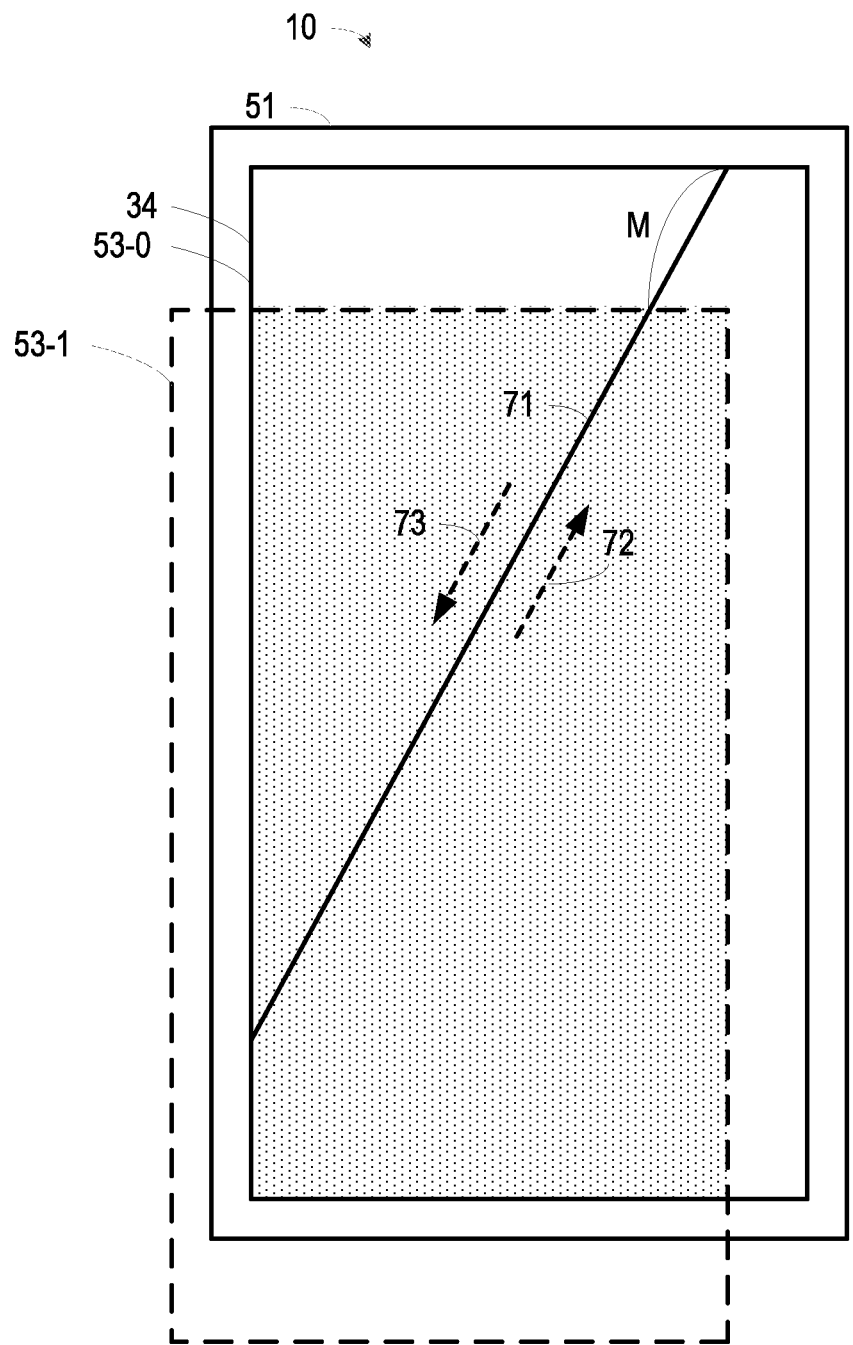
FIG. 21 is a diagram illustrating the display control process according to the second embodiment.

In the present embodiment, descriptions have been made on the example where the smart device 10 is grasped by the right hand. However, the present embodiment is not limited to the example and may be applied to the case where the smart device 10 is grasped by the left hand. FIG. 21 illustrates an example of the movement of the screen image 53-0 when the smart device 10 is grasped by the left hand.

According to the present embodiment, the determination unit 11 determines whether an action is performed with an intention to contact an object displayed at a position that may not be contacted by the thumb approaching the display unit 14 displaying a screen image thereon. When it is determined by the determination unit 11 that the action with the intention to contact the object is performed, the display controller 12 performs a control to move the screen image in the direction in which the object approaches the thumb.

According to the present embodiment, the determination unit 11 determines whether an action of stretching the thumb approaching the display unit 14 is performed, as the action with the invention to contact the object. When it is determined that the action of stretching the thumb is performed, the display controller 12 performs a control to move the screen image in the reverse direction to the stretched direction of the thumb.

According to the present embodiment, the information processing device further includes the detector 13 that detects the operation amount on the information processing device, and the display controller 12 determines the movement amount of the screen image based on the operation amount detected by the detector 13.

According to the present embodiment, the operation amount is a value of the pressure applied to the information processing device when an action of grasping the information processing device is performed.

For example, when a user grasps a smart device 10 with one hand, and the user intends to touch an object (e.g., an application icon) present at a position that the thumb does not reach, the user stretches the thumb toward the object. At this time, a stronger pressure is applied to the smart device 10 by the user's fingers grasping the smart device 10, than that when the thumb is not stretched. The movement amount M of the screen image 53-0 is determined depending on a value of the pressure.

According to the present embodiment, the display change to a screen image which facilitates the one-hand operation on the information processing device may be implemented by the user's natural action of stretching the thumb toward an object and strongly grasping the information processing device.

Third Embodiment

Subsequently, a third embodiment will be described with reference to the drawings. Descriptions of similar configurations and operations to those in the first and second embodiments will be omitted. The third embodiment is different from the second embodiment in that a touch panel 34A according to the third embodiment detects the action of touching the touch panel 34A, but does not detect the hovering operation.

Figure 22:
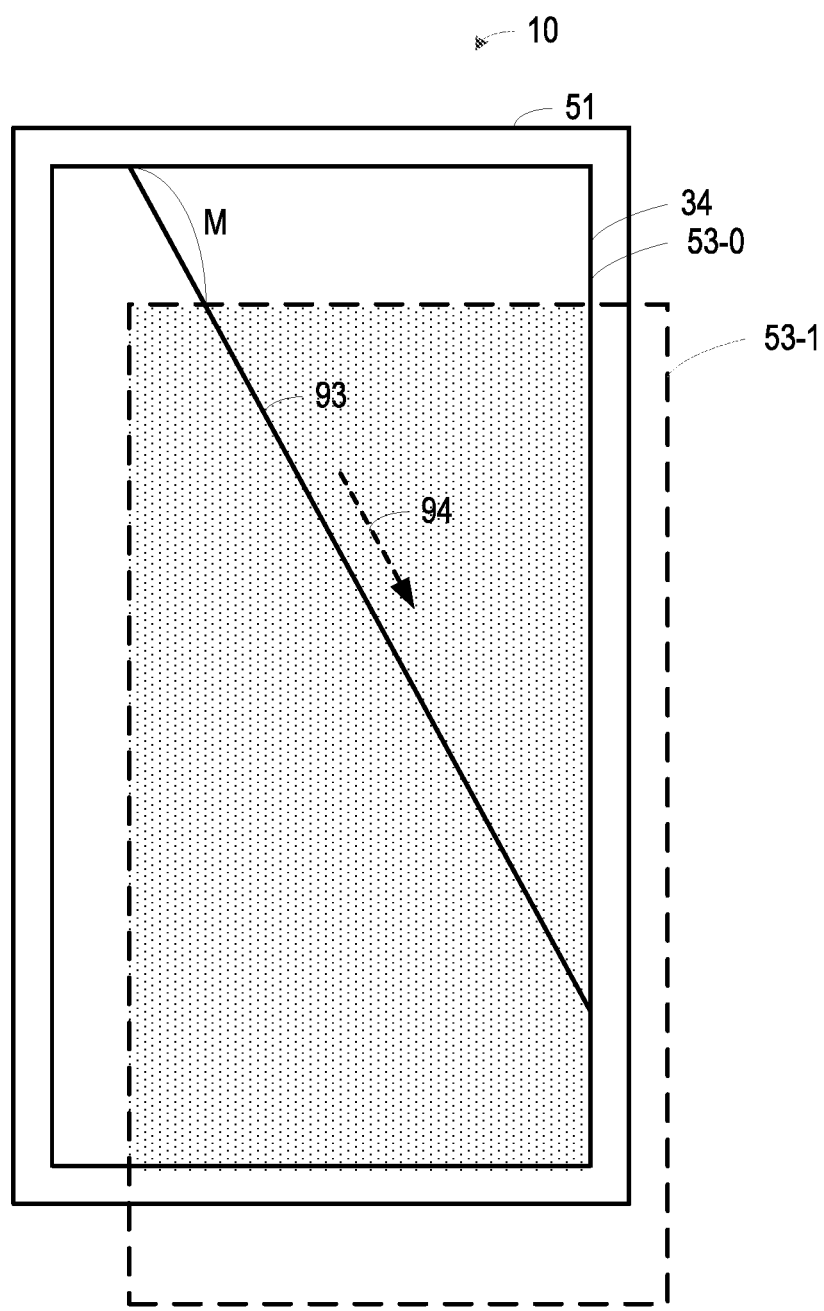
FIG. 22 is a diagram illustrating a display control process according to the third embodiment.

An operation of the smart device 10 according to the present embodiment will be described. In the present embodiment, an action of grasping the smart device 10 so as to cause a strong pressure to be applied to the device is detected as the action with the intention to contact an object. In the present embodiment, as in the second embodiment, the CPU 31 determines the movement amount M for moving the screen image 53-0 illustrated in FIG. 22, based on the pressure applied to the regions 91R and 91L illustrated in FIG. 16. Unlike the second embodiment, however, the direction of the thumb 61A is not determined in the present embodiment.

Figure 23:
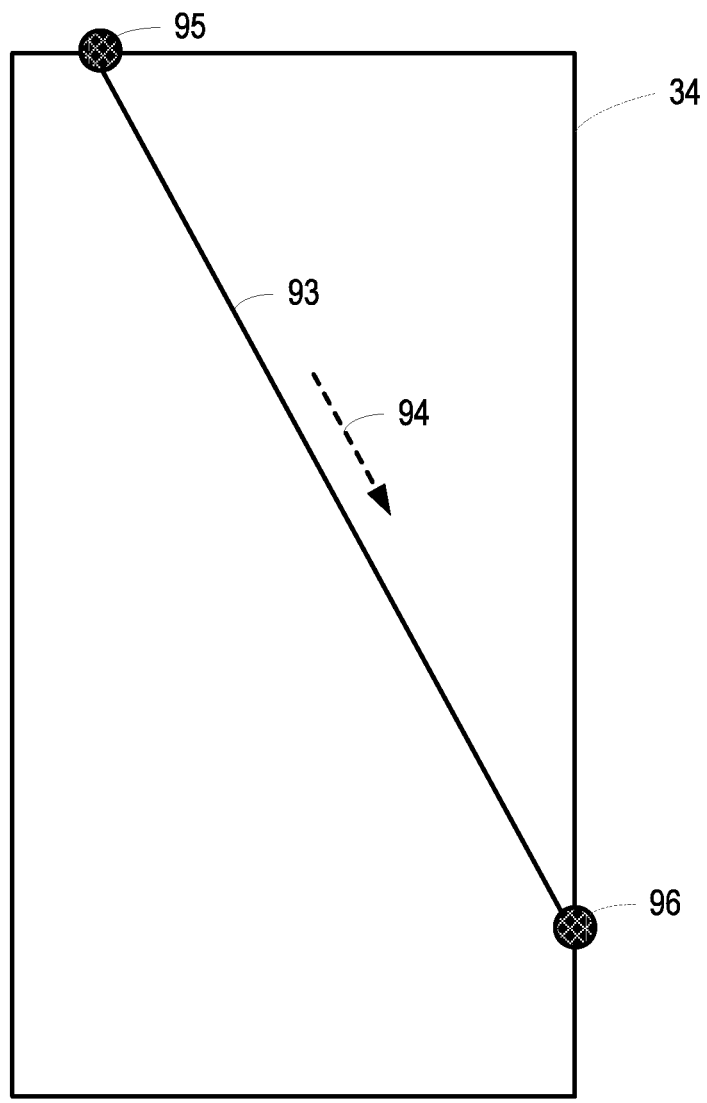
FIG. 23 is a diagram illustrating the display control process according to the third embodiment.

The orientation of a straight line 93 corresponding to the straight line 71 indicating the orientation of the stretched thumb 61A in the first and second embodiments and the direction of an arrow 94 indicating the reverse direction to the direction of the thumb 61A are registered in advance as illustrated in FIG. 23. The orientation of the straight line 93 corresponding to the orientation of the stretched thumb 61A may be registered in the manner that the user designates points 95 and 96. The orientation of the straight line 93 corresponding to the orientation of the stretched thumb 61A may be registered in the manner that the user stretches the thumb 61A to cause the thumb 61A to hover over the touch panel display 34, and the hovering thumb 61A is detected by the touch panel 34A.

Figure 24:
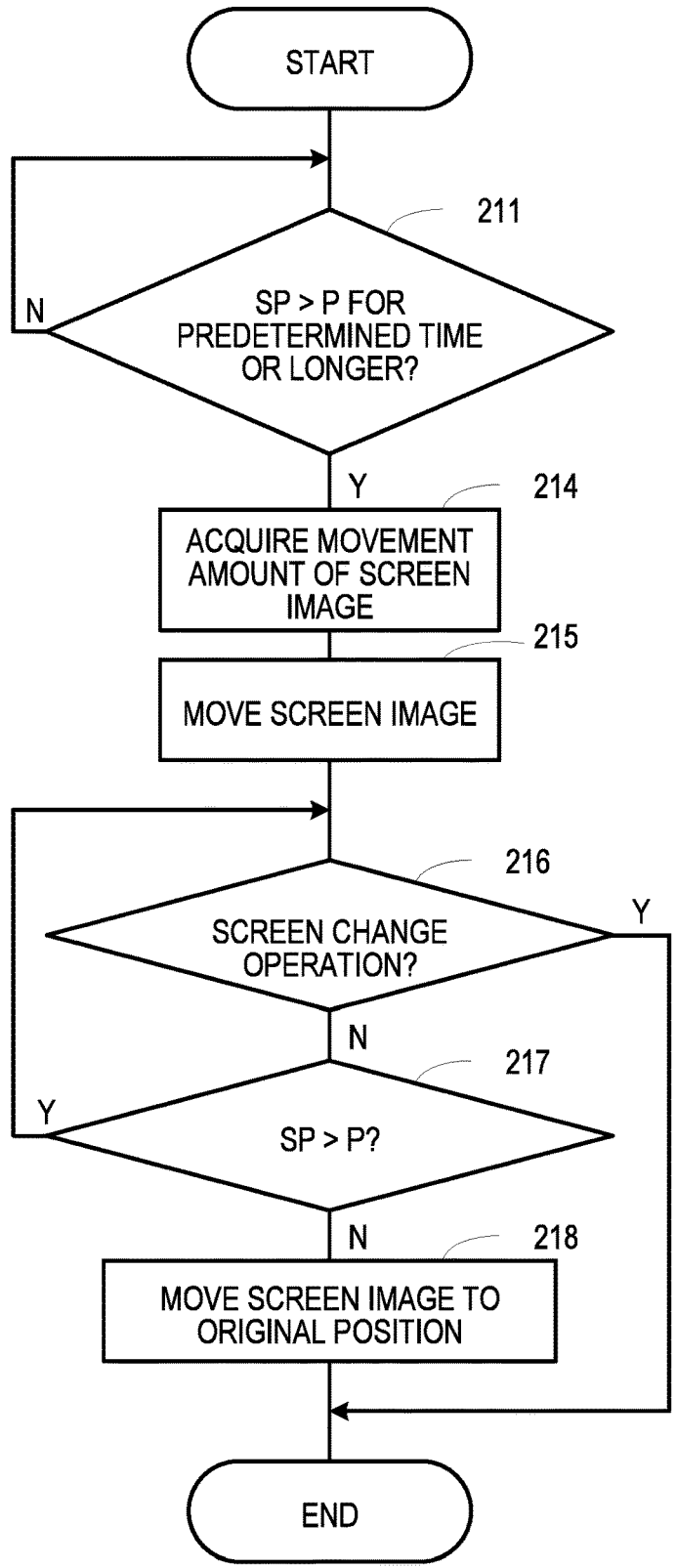
FIG. 24 is a flowchart illustrating an exemplary flow of the display control process according to the third embodiment.

For example, when the power of the smart device 10 is turned ON, the display control process illustrated in FIG. 24 is started. In 215, when moving the screen image 53-0, the CPU 31 causes the screen image 53-0 to be moved in the pre-registered direction of the arrow 94 by the movement amount M. Since 211, 214, 216, 217, and 218 are identical to those in the second embodiment, descriptions thereof will be omitted.

In the present embodiment, the process of at least a portion of the first and second embodiments may be applied.

Figure 25:
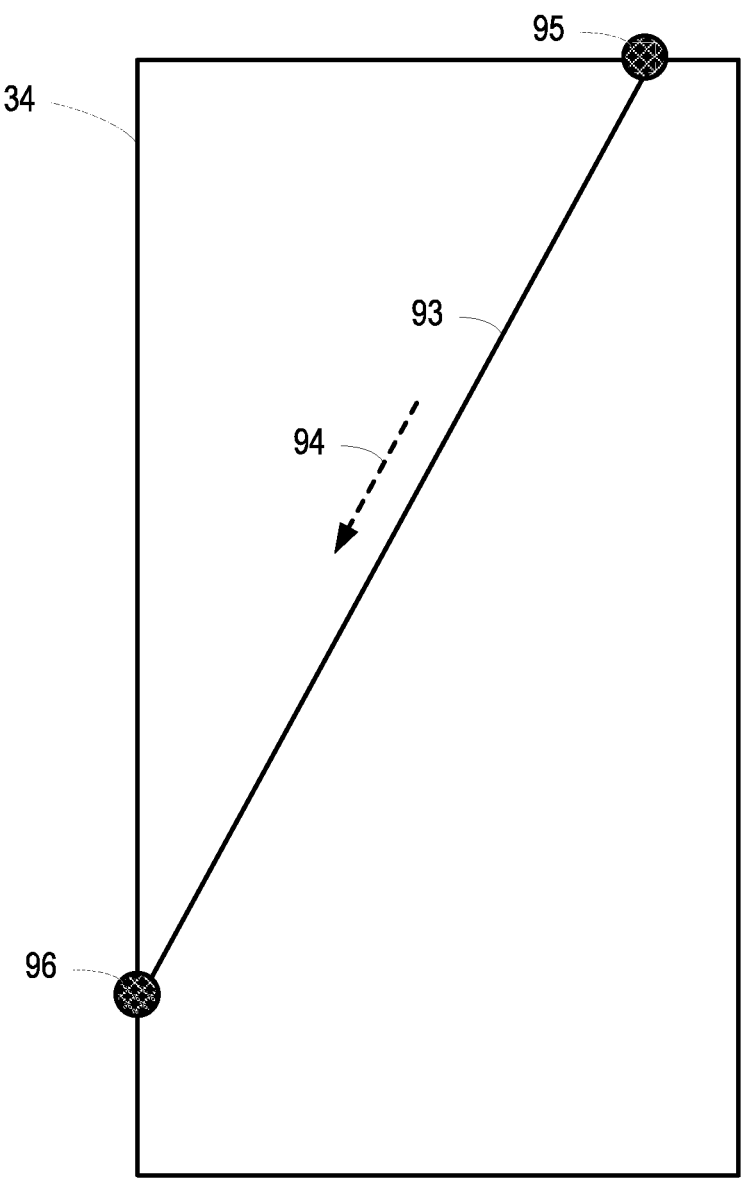
FIG. 25 is a diagram illustrating the display control process according to the third embodiment.
Figure 26:
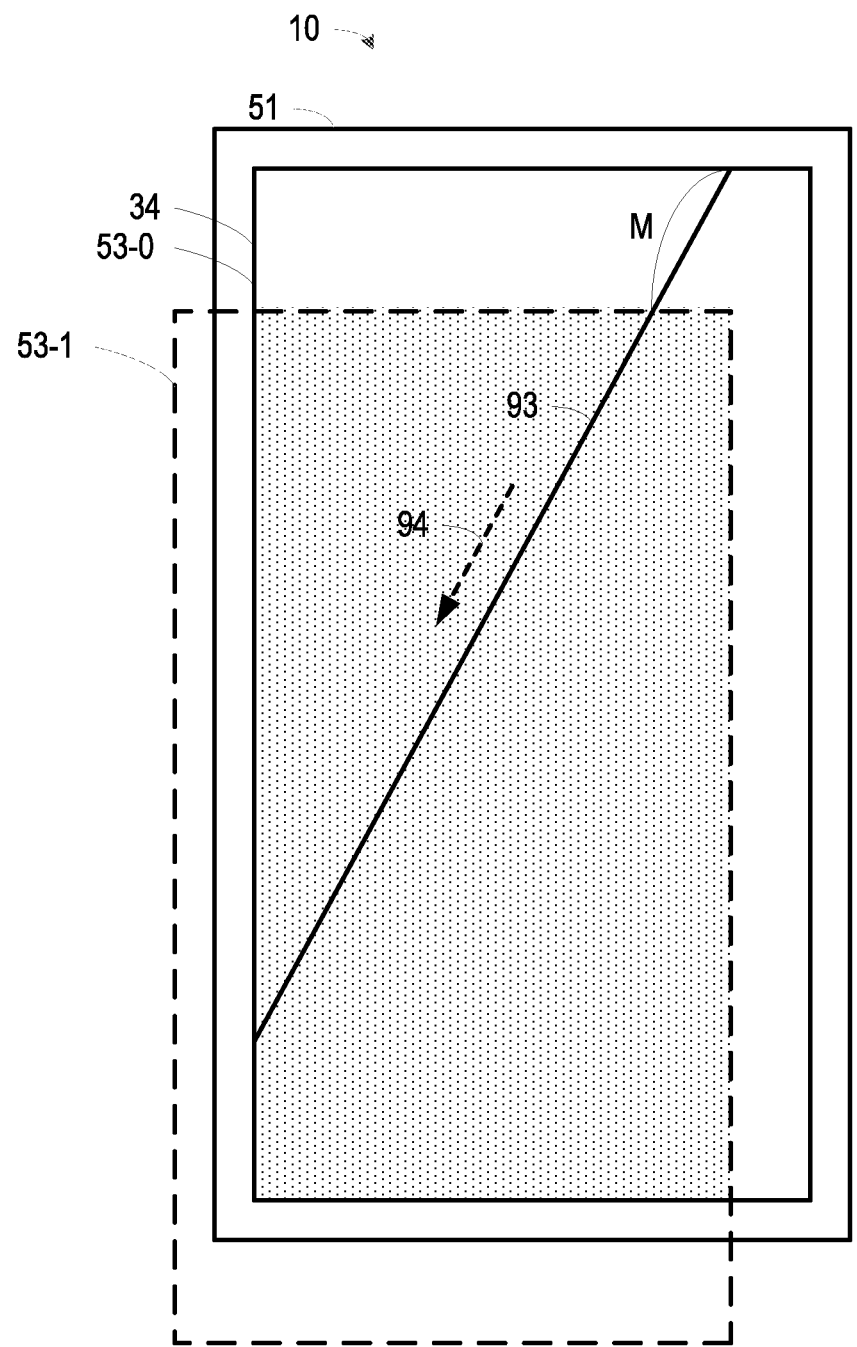
FIG. 26 is a diagram illustrating the display control process according to the third embodiment.

In the present embodiment, descriptions have been made on the example where the smart device 10 is grasped by the right hand. However, the present embodiment is not limited to the example and may be applied to the case where the smart device 10 is grasped by the left hand. FIG. 25 illustrates an example of the arrow 94 indicating the pre-registered direction for the movement of the screen image 53-0 when the smart device 10 is grasped by the left hand. FIG. 26 illustrates an example of the movement of the screen image 53-0.

According to the present embodiment, the determination unit 11 determines whether an action is performed with an intention to contact an object displayed at a position that may not be contacted by the thumb approaching the display unit 14 displaying a screen image thereon. When it is determined by the determination unit 11 that the action with the intention to contact the object is performed, the display controller 12 performs a control to move the screen image in the direction in which the object approaches the thumb.

According to the present embodiment, the determination unit 11 determines whether an action of grasping the smart device 10 while applying thereto a pressure having a value exceeding a predetermined value is performed, as the action with the intention to contact the object. When it is determined that the action of grasping the smart device 10 while applying thereto a pressure having a value exceeding the predetermined value is performed, the display controller 12 performs a control to move the screen image in the direction in which the object approaches the thumb.

For example, when a user grasps a smart device 10 with one hand, and the user intends to touch an object (e.g., an application icon) present at a position that the thumb does not reach, the user stretches the thumb toward the application icon. At this time, a stronger pressure is applied to the smart device 10 by the user's fingers grasping the smart device 10, than that when the thumb is not stretched. The movement amount M of the screen image 53-0 is determined depending on a value of the pressure. According to the present embodiment, since the direction of the thumb is not determined, the configuration to detect the thumb hovering over the touch panel display 34 may be omitted.

According to the present embodiment, the display change to a screen image which facilitates the one-hand operation of the information processing device may be implemented by the user's natural action of strongly grasping the information processing device.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiments of the present disclosure have been described in detail, it should be understood that the various changes, substitutions, and alterations could be made hereto without departing from the spirit and scope of the disclosure.

What is claimed is:

1. An information processing device, comprising:
   a memory; and
   a processor coupled to the memory and the processor configured to:
      determine whether a first state is detected, the first state being defined as indicating an intention to contact an object displayed at a position that may not be contacted by a thumb approaching a display unit on which a screen image is displayed; and
      move, when it is determined that the first state is detected, the screen image in a direction in which the object approaches the thumb, wherein
   the first state is a state where the thumb is hovering over the display unit and the thumb is stretched toward the object, and
   when determining whether the first state is detected, the processor determines that the first state is detected when an area of a first region exceeds a second predetermined value, the first region being a region where an electrostatic capacitance depending on the thumb exceeds a first predetermined value, the electrostatic capacitance being detected by a touch panel disposed on the display unit.

2. The information processing device according to claim 1, wherein
   the processor is configured to:
      determine whether the stretched thumb is bent after moving the screen image; and
      move the screen image back to an original position when it is determined that the stretched thumb is bent, the original position being a position of the screen image before moving the screen image.

3. The information processing device according to claim 1, wherein
   the processor is configured to:
      detect an operation amount of an operation performed on the information processing device; and
      determine, depending on the detected operation amount, a movement amount of moving the screen image when moving the screen image.

4. The information processing device according to claim 3, wherein
   the operation amount is a value of a pressure applied to the information processing device when an action of grasping the information processing device is performed.

5. The information processing device according to claim 1, wherein the processor is configured to:
   acquire, before moving the screen image, a direction of the stretched thumb based on a magnitude of the electrostatic capacitance in the first region when it is determined that the first state is detected, wherein
   the processor moves the screen image in a reverse direction to the direction of the stretched thumb when moving the screen image.

6. A display control method, comprising:
   determining, by a computer, whether a first state is detected, the first state being defined as indicating an intention to contact an object displayed at a position that may not be contacted by a thumb approaching a display unit on which a screen image is displayed; and moving, when it is determined that the first state is detected, the screen image in a direction in which the object approaches the thumb, wherein the first state is a state where the thumb is hovering over the display unit and the thumb is stretched toward the object, and it is determined by the computer that the first state is detected when an area of a first region exceeds a second predetermined value, the first region being a region where an electrostatic capacitance depending on the thumb exceeds a first predetermined value, the electrostatic capacitance being detected by a touch panel disposed on the display unit.

7. The display control method according to claim 6, comprising:

determining whether the stretched thumb is bent after moving the screen image; and moving the screen image back to an original position when it is determined that the stretched thumb is bent, the original position being a position of the screen image before moving the screen image.

8. The display control method according to claim 6, comprising:

detecting an operation amount of an operation performed on the computer; and determining, depending on the detected operation amount, a movement amount of moving the screen image when moving the screen image.

9. The display control method according to claim 8, wherein the operation amount is a value of a pressure applied to the computer when an action of grasping the computer is performed.

10. The display control method according to claim 6, comprising:

acquiring, before moving the screen image, a direction of the stretched thumb based on a magnitude of the electrostatic capacitance in the first region when it is determined that the first state is detected, wherein the computer moves the screen image in a reverse direction to the direction of the stretched thumb when moving the screen image.

11. A non-transitory computer-readable recording medium having stored therein a program that causes a computer to execute a process, the process comprising:

determining whether a first state is detected, the first state being defined as indicating an intention to contact an object displayed at a position that may not be contacted by a thumb approaching a display unit on which a screen image is displayed; and moving, when it is determined that the first state is detected, the screen image in a direction in which the object approaches the thumb, wherein the first state is a state where the thumb is hovering over the display unit and the thumb is stretched toward the object, and it is determined by the computer that the first state is detected when an area of a first region exceeds a second predetermined value, the first region being a region where an electrostatic capacitance depending on the thumb exceeds a first predetermined value, the electrostatic capacitance being detected by a touch panel disposed on the display unit.

12. The non-transitory computer-readable recording medium according to claim 11, the process comprising:

determining whether the stretched thumb is bent after moving the screen image; and moving the screen image back to an original position when it is determined that the stretched thumb is bent, the original position being a position of the screen image before moving the screen image.

13. The non-transitory computer-readable recording medium according to claim 11, the process comprising:

detecting an operation amount of an operation performed on the computer; and determining, depending on the detected operation amount, a movement amount of moving the screen image when moving the screen image.

14. The non-transitory computer-readable recording medium according to claim 13, wherein the operation amount is a value of a pressure applied to the computer when an action of grasping the computer is performed.

15. The non-transitory computer-readable recording medium according to claim 11, the process comprising:

acquiring, before moving the screen image, a direction of the stretched thumb based on a magnitude of the electrostatic capacitance in the first region when it is determined that the first state is detected, wherein the computer moves the screen image in a reverse direction to the direction of the stretched thumb when moving the screen image.

\* \* \* \* \*